United States Patent
Uchiyama

(10) Patent No.: US 9,778,927 B2
(45) Date of Patent: Oct. 3, 2017

(54) STORAGE CONTROL DEVICE TO CONTROL STORAGE DEVICES OF A FIRST TYPE AND A SECOND TYPE

(71) Applicant: FUJITSU LIMITED, Kawasaki-shi, Kanagawa (JP)

(72) Inventor: Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/004,006

(22) Filed: Jan. 22, 2016

(65) Prior Publication Data

US 2016/0246587 A1  Aug. 25, 2016

(30) Foreign Application Priority Data

Feb. 24, 2015  (JP) .................................. 2015-034596

(51) Int. Cl.
G06F 9/44 (2006.01)
G06F 9/445 (2006.01)

(52) U.S. Cl.
CPC ...................................... G06F 8/65 (2013.01)

(58) Field of Classification Search
CPC ......................................................... G06F 8/65
See application file for complete search history.

(56) References Cited

U.S. PATENT DOCUMENTS

| | | | |
|---|---|---|---|
| 6,675,258 B1* | 1/2004 | Bramhall | G06F 8/65 711/100 |
| 8,028,155 B1* | 9/2011 | Righi | G06F 9/4406 713/1 |
| 2004/0128363 A1* | 7/2004 | Yamagami | G06F 11/2069 709/217 |
| 2007/0260835 A1* | 11/2007 | Takatsu | G06F 11/1456 711/162 |
| 2009/0077547 A1 | 3/2009 | Kakinoki | |
| 2014/0201442 A1* | 7/2014 | Rajasekaran | G06F 12/0871 711/119 |
| 2016/0170841 A1* | 6/2016 | Yarnell | G06F 11/1076 714/19 |

FOREIGN PATENT DOCUMENTS

JP  2009-75716  4/2009
JP  2010-117970  5/2010

* cited by examiner

*Primary Examiner* — Hang Pan
(74) *Attorney, Agent, or Firm* — Staas & Halsey LLP

(57) ABSTRACT

A storage control device includes a processor. The processor is configured to classify second type storage devices into a first group and a second group. The second type storage devices temporarily store thereof data held in a first type storage device. The processor is configured to access the first type storage device using storage devices belonging to the second group while updating firmware of storage devices belonging to the first group.

8 Claims, 38 Drawing Sheets

FIG. 5

LV INFORMATION TABLE 401

| LV NAME | FILE SYSTEM NAME | LV CAPACITY [Byte] | STATE | PV NAME | |
|---|---|---|---|---|---|
| A00000 | DATA-11 | 1000000 | ON CACHE | TVXQ00 | 501-1 |
| A00001 | DATA-12 | 1000000 | OFF CACHE | TVXQ00 | 501-2 |
| A00002 | DATA-11 | 500000 | UNDER MIGRATION PROCESS | TVXQ00 | 501-3 |
| A00003 | DATA-21 | 500000 | UNDER APPEND WRITE PROCESS | — | 501-4 |
| B00000 | DATA-12 | 100000 | UNDER READ PROCESS | TVXQ01 | 501-5 |
| B00001 | DATA-21 | 100000 | UNDER RECALL PROCESS | TVXQ01 | 501-6 |
| B00002 | DATA-11 | 100000 | UNDER REORGANIZATION PROCESS | TVXQ01 | 501-7 |
| ... | ... | ... | ... | ... | |

FIG. 6

DISK INFORMATION TABLE — 402

| DISK NAME | VENDOR NAME | FIRM VERSION NUMBER | RAID GROUP NAME | |
|---|---|---|---|---|
| Disk#00 | COMPANY A | AA09 | RAID#CNF | 601-1 |
| Disk#01 | COMPANY A | AA09 | RAID#CNF | 601-2 |
| Disk#02 | COMPANY F | FA88 | RAID#DATA-1 | 601-3 |
| Disk#03 | COMPANY F | FA88 | RAID#DATA-1 | 601-4 |
| Disk#04 | COMPANY F | FA88 | RAID#DATA-2 | 601-5 |
| Disk#05 | COMPANY F | FA88 | RAID#DATA-2 | 601-6 |
| Disk#06 | COMPANY F | FA88 | RAID#DATA-2 | 601-7 |
| ... | ... | ... | ... | |

FIG. 13

| PRIORITY | GROUP | STATE OF LV | |
|---|---|---|---|
| 1 | GROUP B (I/O IS FIRST PERFORMED) | ON CACHE | ~1301-1 |
| 2 | GROUP B (I/O IS FIRST PERFORMED) | OFF CACHE | ~1301-2 |
| 3 | GROUP A (FIRM APPLICATION IS FIRST PERFORMED) | OFF CACHE | ~1301-3 |
| 4 | GROUP A (FIRM APPLICATION IS FIRST PERFORMED) | ON CACHE | ~1301-4 |

FIG. 14

| PRIORITY | GROUP | STATE OF LV | |
|---|---|---|---|
| 1 | GROUP A (FIRM APPLICATION IS FIRST PERFORMED) | ON CACHE | ~1401-1 |
| 2 | GROUP A (FIRM APPLICATION IS FIRST PERFORMED) | OFF CACHE | ~1401-2 |
| 3 | GROUP B (I/O IS FIRST PERFORMED) | OFF CACHE | ~1401-3 |
| 4 | GROUP B (I/O IS FIRST PERFORMED) | ON CACHE | ~1401-4 |

FIG. 15A

| RAID GROUP (LVrd) | ON CACHE LV PROCESSING TIME (LVtm) | 1501 |
|---|---|---|
| RAID#DATA-1 | 10 | 1501-1 |
| RAID#DATA-2 | 5 | 1501-2 |
| RAID#DATA-3 | 20 | 1501-3 |
| RAID#DATA-4 | 15 | 1501-4 |

FIG. 15B

| RAID GROUP (LVrd) | ON CACHE LV PROCESSING TIME (LVstm_n) | 1501 |
|---|---|---|
| RAID#DATA-3 | 20 | 1501-3 |
| RAID#DATA-4 | 15 | 1501-4 |
| RAID#DATA-1 | 10 | 1501-1 |
| RAID#DATA-2 | 5 | 1501-2 |

FIG. 15C

| GROUP NAME | PROCESS TO BE PERFORMED EARLIER | RAID GROUP | 1502 |
|---|---|---|---|
| A | FIRM APPLICATION | RAID#DATA-1, 2, 4 | 1502-1 |
| B | I/O FROM HOST DEVICE | RAID#DATA-3 | 1502-2 |

| PROCESS NAME | FROM | TO | AVAILABILITY OF PROCESS |
|---|---|---|---|
| APPEND WRITE PROCESS | HOST DEVICE | RAID#DATA-1 | AVAILABLE |
| | | RAID#DATA-2 | NOT AVAILABLE |
| RECALL PROCESS | PV | RAID#DATA-1 | AVAILABLE |
| | | RAID#DATA-2 | NOT AVAILABLE |
| MIGRATION PROCESS | RAID#DATA-1 | PV | AVAILABLE |
| | RAID#DATA-2 | | NOT AVAILABLE |

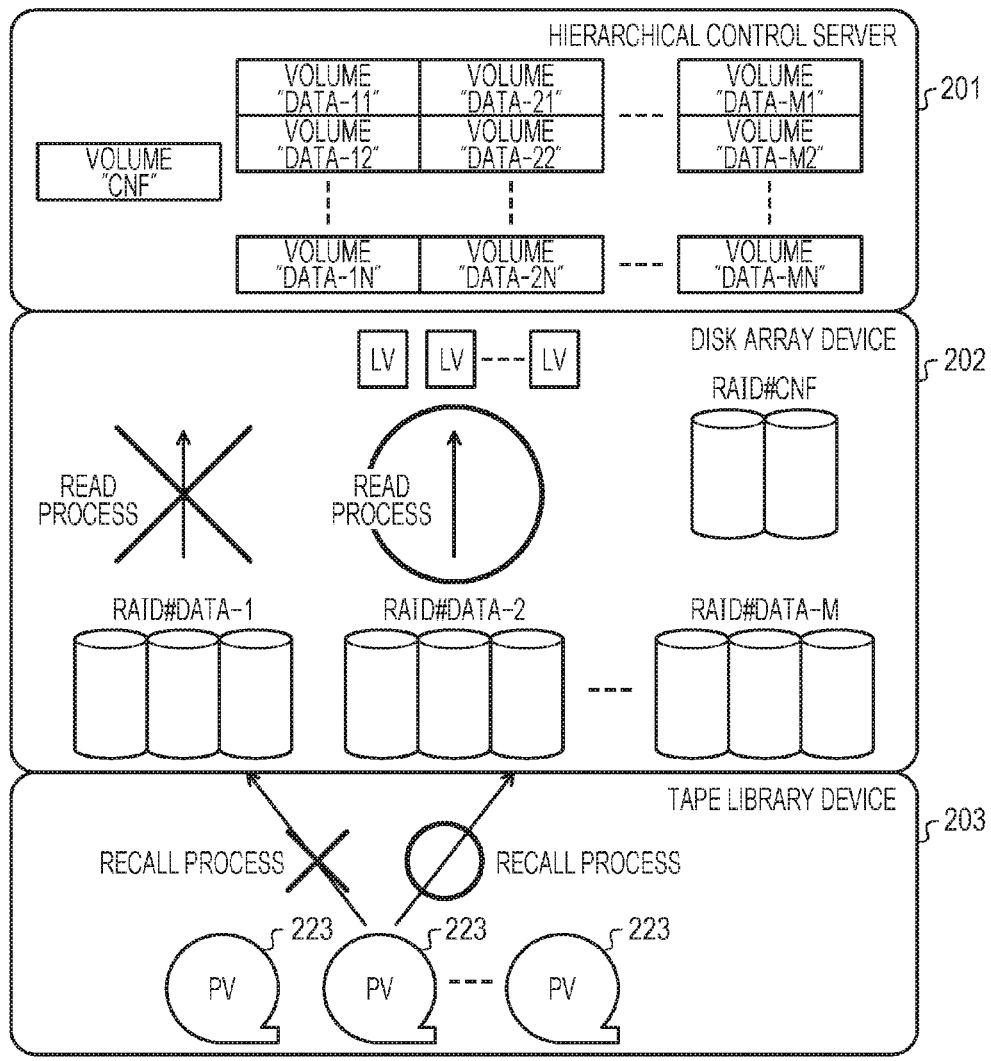

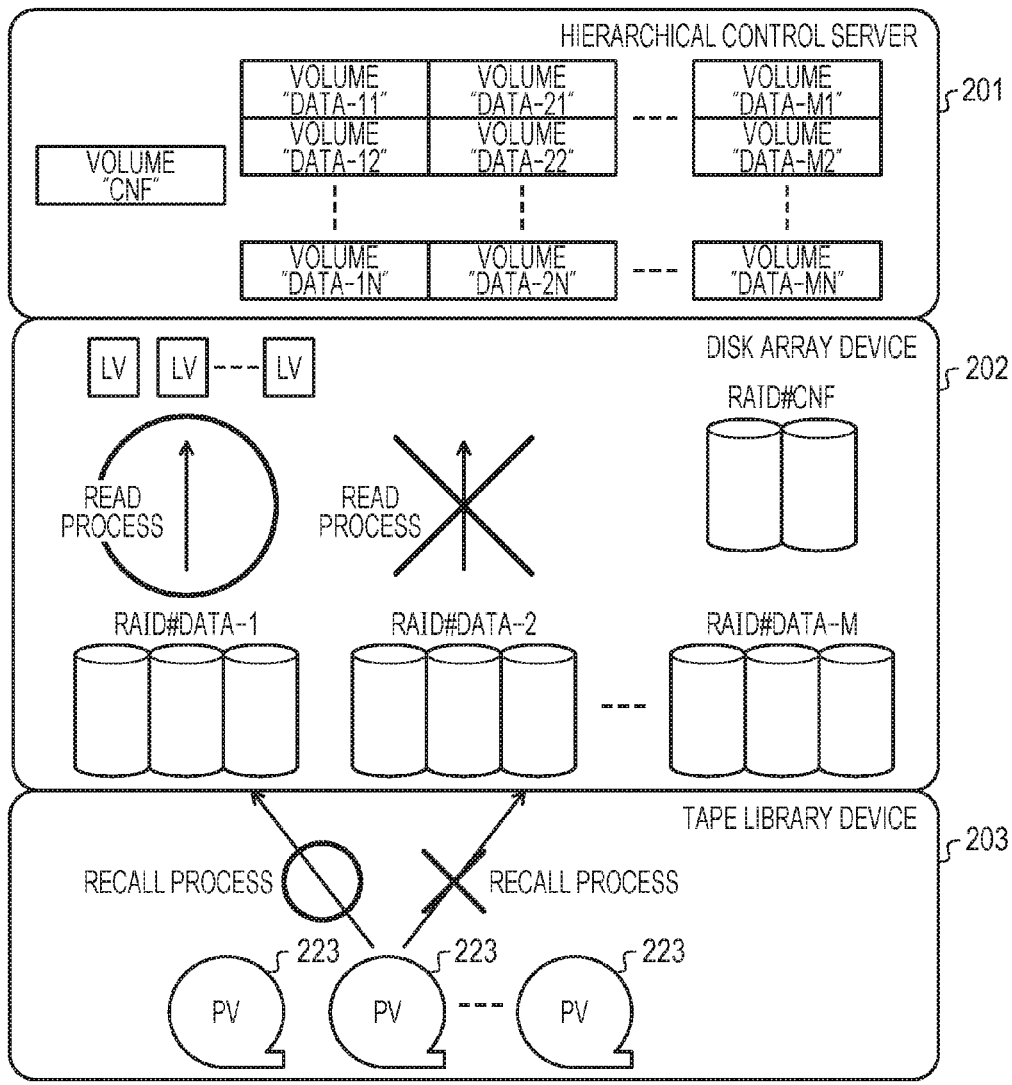

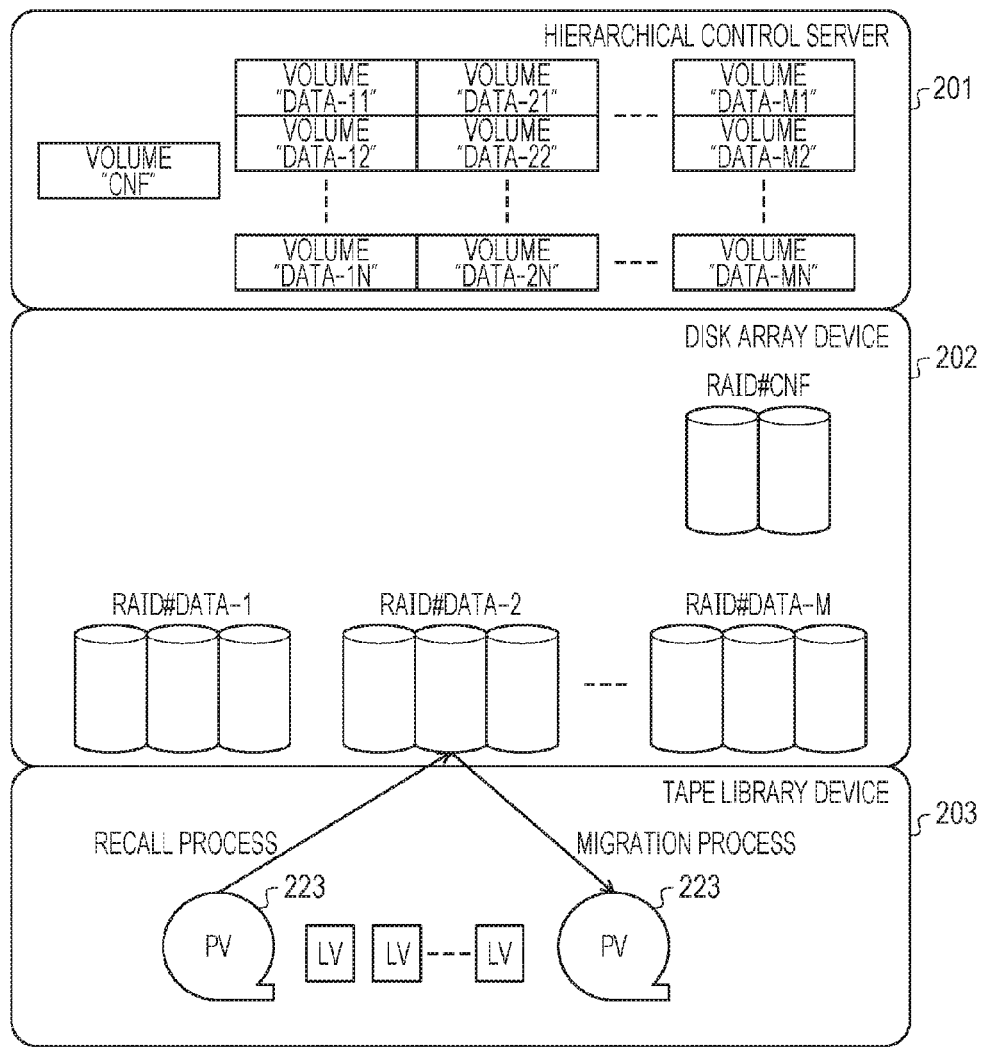

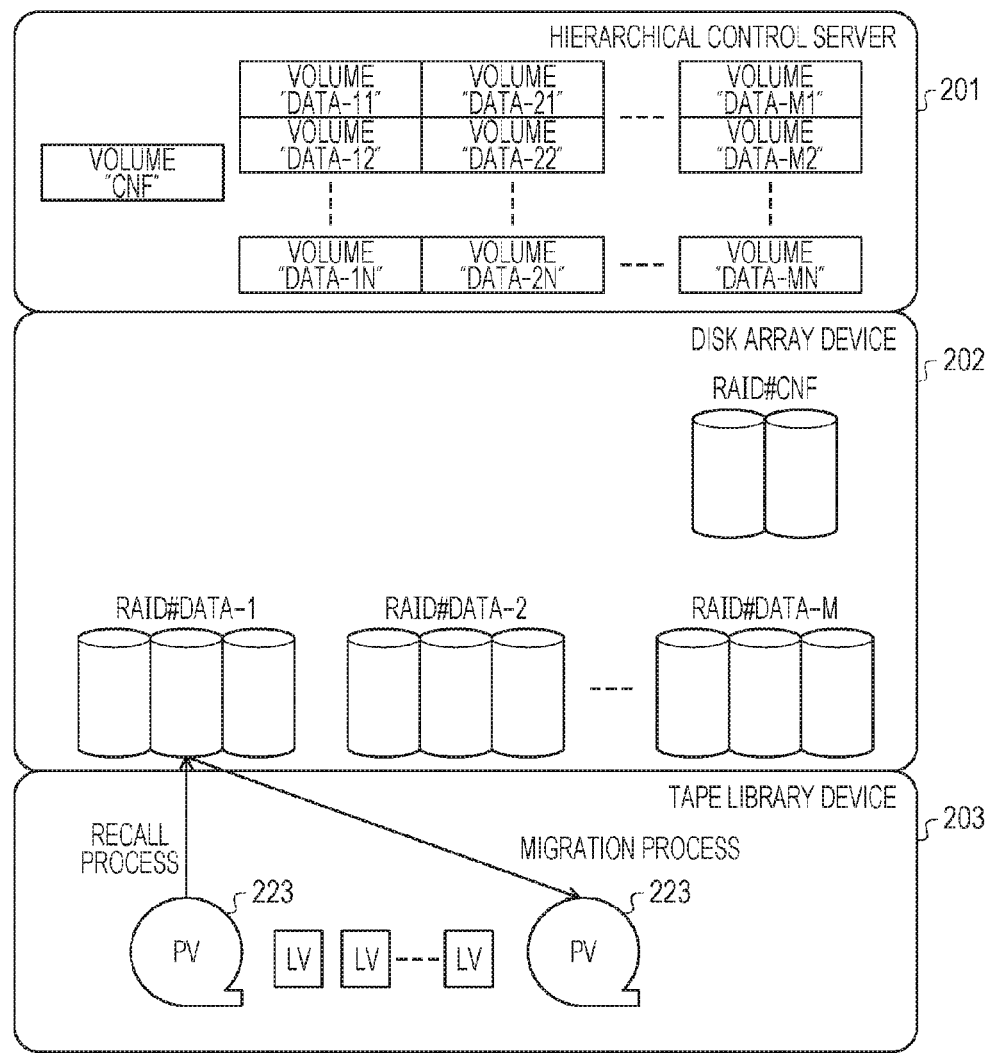

FIG. 22A

| LV NAME | FILE SYSTEM NAME | LV CAPACITY [Byte] | STATE | PV NAME | |
|---|---|---|---|---|---|
| APWR01 | DATA-21 | 500000 | ON CACHE | TVXQ00 | ~2201-1 |
| READ01 | DATA-21 | 500000 | ON CACHE | TVXQ00 | ~2201-2 |
| REOG01 | DATA-21 | 500000 | ON CACHE | TVXQ00 | ~2201-3 |

| LV NAME | FILE SYSTEM NAME | LV CAPACITY [Byte] | STATE | PV NAME | |
|---|---|---|---|---|---|
| APWR01 | DATA-21 | 750000 | UNDER APPEND WRITE PROCESS | TVXQ00 | ~2201-1 |
| READ01 | DATA-21 | 500000 | UNDER READ PROCESS | TVXQ00 | ~2201-2 |
| REOG01 | DATA-21 | 500000 | UNDER REORGANIZATION PROCESS | TVXQ01 | ~2201-3 |

| LV NAME | FILE SYSTEM NAME | LV CAPACITY [Byte] | STATE | PV NAME | |
|---|---|---|---|---|---|
| APWR01 | DATA-21 | 1000000 | UNDER MIGRATION PROCESS | TVXQ00 | ~2201-1 |
| READ01 | DATA-21 | 500000 | ON CACHE | TVXQ00 | ~2201-2 |
| REOG01 | DATA-21 | 500000 | ON CACHE | TVXQ01 | ~2201-3 |

| LV NAME | FILE SYSTEM NAME | LV CAPACITY [Byte] | STATE | PV NAME | |
|---|---|---|---|---|---|
| APWR01 | DATA-21 | 1000000 | ON CACHE | TVXQ00 | ~2201-1 |
| READ01 | DATA-21 | 500000 | ON CACHE | TVXQ00 | ~2201-2 |
| REOG01 | DATA-21 | 500000 | ON CACHE | TVXQ01 | ~2201-3 |

| LV NAME | FILE SYSTEM NAME | LV CAPACITY [Byte] | STATE | PV NAME | |
|---|---|---|---|---|---|
| APWR02 | DATA-21 | 500000 | OFF CACHE | TVXQ00 | ~2301-1 |
| READ02 | DATA-21 | 500000 | OFF CACHE | TVXQ00 | ~2301-2 |
| REOG02 | DATA-21 | 500000 | OFF CACHE | TVXQ00 | ~2301-3 |

| LV NAME | FILE SYSTEM NAME | LV CAPACITY [Byte] | STATE | PV NAME | |
|---|---|---|---|---|---|
| APWR02 | DATA-21 | 500000 | UNDER RECALL PROCESS | TVXQ00 | ~2301-1 |
| READ02 | DATA-21 | 500000 | UNDER RECALL PROCESS | TVXQ00 | ~2301-2 |
| REOG02 | DATA-21 | 500000 | UNDER RECALL PROCESS | TVXQ00 | ~2301-3 |

| LV NAME | FILE SYSTEM NAME | LV CAPACITY [Byte] | STATE | PV NAME | |
|---|---|---|---|---|---|
| APWR02 | DATA-21 | 750000 | UNDER APPEND WRITE PROCESS | TVXQ00 | ~2301-1 |
| READ02 | DATA-21 | 500000 | UNDER READ PROCESS | TVXQ00 | ~2301-2 |
| REOG02 | DATA-21 | 500000 | UNDER REORGANIZATION PROCESS | TVXQ01 | ~2301-3 |

| LV NAME | FILE SYSTEM NAME | LV CAPACITY [Byte] | STATE | PV NAME | |
|---|---|---|---|---|---|
| APWR02 | DATA-21 | 1000000 | UNDER MIGRATION PROCESS | TVXQ00 | ~2301-1 |
| READ02 | DATA-21 | 500000 | ON CACHE | TVXQ00 | ~2301-2 |
| REOG02 | DATA-21 | 500000 | ON CACHE | TVXQ01 | ~2301-3 |

| LV NAME | FILE SYSTEM NAME | LV CAPACITY [Byte] | STATE | PV NAME | |
|---|---|---|---|---|---|
| APWR02 | DATA-21 | 1000000 | ON CACHE | TVXQ00 | ~2301-1 |
| READ02 | DATA-21 | 500000 | ON CACHE | TVXQ00 | ~2301-2 |
| REOG02 | DATA-21 | 500000 | ON CACHE | TVXQ01 | ~2301-3 |

| LV NAME | FILE SYSTEM NAME | LV CAPACITY [Byte] | STATE | PV NAME | |
|---|---|---|---|---|---|
| | | | | | ~401 |
| APWR03 | DATA-11 | 500000 | OFF CACHE | TVXQ00 | ~2401-1 |
| READ03 | DATA-11 | 500000 | OFF CACHE | TVXQ00 | ~2401-2 |
| REOG03 | DATA-11 | 500000 | OFF CACHE | TVXQ00 | ~2401-3 |

FIG. 24B

| LV NAME | FILE SYSTEM NAME | LV CAPACITY [Byte] | STATE | PV NAME | |
|---|---|---|---|---|---|
| | | | | | ~401 |
| APWR03 | DATA-21 | 500000 | UNDER RECALL PROCESS | TVXQ00 | ~2401-1 |
| READ03 | DATA-21 | 500000 | UNDER RECALL PROCESS | TVXQ00 | ~2401-2 |
| REOG03 | DATA-21 | 500000 | UNDER RECALL PROCESS | TVXQ00 | ~2401-3 |

FIG. 24C

| LV NAME | FILE SYSTEM NAME | LV CAPACITY [Byte] | STATE | PV NAME | |
|---|---|---|---|---|---|
| | | | | | ~401 |
| APWR03 | DATA-21 | 750000 | UNDER APPEND WRITE PROCESS | TVXQ00 | ~2401-1 |
| READ03 | DATA-21 | 500000 | UNDER READ PROCESS | TVXQ00 | ~2401-2 |
| REOG03 | DATA-21 | 500000 | UNDER REORGANIZATION PROCESS | TVXQ01 | ~2401-3 |

FIG. 24D

| LV NAME | FILE SYSTEM NAME | LV CAPACITY [Byte] | STATE | PV NAME | |
|---|---|---|---|---|---|
| | | | | | ~401 |
| APWR03 | DATA-21 | 1000000 | UNDER MIGRATION PROCESS | TVXQ00 | ~2401-1 |
| READ03 | DATA-21 | 500000 | ON CACHE | TVXQ00 | ~2401-2 |
| REOG03 | DATA-21 | 500000 | ON CACHE | TVXQ01 | ~2401-3 |

FIG. 24E

| LV NAME | FILE SYSTEM NAME | LV CAPACITY [Byte] | STATE | PV NAME | |
|---|---|---|---|---|---|
| | | | | | ~401 |
| APWR03 | DATA-21 | 1000000 | ON CACHE | TVXQ00 | ~2401-1 |
| READ03 | DATA-21 | 500000 | ON CACHE | TVXQ00 | ~2401-2 |
| REOG03 | DATA-21 | 500000 | ON CACHE | TVXQ01 | ~2401-3 |

FIG. 25A

| LV NAME | FILE SYSTEM NAME | LV CAPACITY [Byte] | STATE | PV NAME | |
|---|---|---|---|---|---|
| APWR04 | DATA-21 | 500000 | ON CACHE | TVXQ00 | ~401 |
| READ04 | DATA-21 | 500000 | ON CACHE | TVXQ00 | ~2501-1 |
| REOG04 | DATA-21 | 500000 | ON CACHE | TVXQ00 | ~2501-2 |
| | | | | | ~2501-3 |

FIG. 25B

| LV NAME | FILE SYSTEM NAME | LV CAPACITY [Byte] | STATE | PV NAME | |
|---|---|---|---|---|---|
| APWR04 | DATA-11 | 500000 | UNDER RECALL PROCESS | TVXQ00 | ~401 |
| READ04 | DATA-11 | 500000 | UNDER RECALL PROCESS | TVXQ00 | ~2501-1 |
| REOG04 | DATA-11 | 500000 | UNDER RECALL PROCESS | TVXQ00 | ~2501-2 |
| | | | | | ~2501-3 |

FIG. 25C

| LV NAME | FILE SYSTEM NAME | LV CAPACITY [Byte] | STATE | PV NAME | |
|---|---|---|---|---|---|
| APWR04 | DATA-11 | 750000 | UNDER APPEND WRITE PROCESS | TVXQ00 | ~401 |
| READ04 | DATA-11 | 500000 | UNDER READ PROCESS | TVXQ00 | ~2501-1 |
| REOG04 | DATA-11 | 500000 | UNDER REORGANIZATION PROCESS | TVXQ01 | ~2501-2 |
| | | | | | ~2501-3 |

FIG. 25D

| LV NAME | FILE SYSTEM NAME | LV CAPACITY [Byte] | STATE | PV NAME | |
|---|---|---|---|---|---|
| APWR04 | DATA-11 | 1000000 | UNDER MIGRATION PROCESS | TVXQ00 | ~401 |
| READ04 | DATA-11 | 500000 | ON CACHE | TVXQ00 | ~2501-1 |
| REOG04 | DATA-11 | 500000 | ON CACHE | TVXQ01 | ~2501-2 |
| | | | | | ~2501-3 |

FIG. 25E

| LV NAME | FILE SYSTEM NAME | LV CAPACITY [Byte] | STATE | PV NAME | |
|---|---|---|---|---|---|
| APWR04 | DATA-11 | 1000000 | ON CACHE | TVXQ00 | ~401 |
| READ04 | DATA-11 | 500000 | ON CACHE | TVXQ00 | ~2501-1 |
| REOG04 | DATA-11 | 500000 | ON CACHE | TVXQ01 | ~2501-2 |
| | | | | | ~2501-3 |

FIG. 26A

| FILE SYSTEM NAME | MOUNT STATE | RAID GROUP | ~404 |
|---|---|---|---|
| CNF | MOUNTED | RAID#CNF | ~2601-1 |
| DATA-11 | MOUNTED | RAID#DATA-1 | ~2601-2 |
| DATA-12 | MOUNTED | RAID#DATA-1 | ~2601-3 |
| DATA-21 | MOUNTED | RAID#DATA-2 | ~2601-4 |
| DATA-22 | MOUNTED | RAID#DATA-2 | ~2601-5 |
| : | : | : | |

FIG. 26B

| FILE SYSTEM NAME | MOUNT STATE | RAID GROUP | ~404 |
|---|---|---|---|
| CNF | MOUNTED | RAID#CNF | ~2601-1 |
| DATA-11 | UNMOUNTED | RAID#DATA-1 | ~2601-2 |
| DATA-12 | UNMOUNTED | RAID#DATA-1 | ~2601-3 |
| DATA-21 | MOUNTED | RAID#DATA-2 | ~2601-4 |
| DATA-22 | MOUNTED | RAID#DATA-2 | ~2601-5 |
| : | : | : | |

FIG. 26C

| FILE SYSTEM NAME | MOUNT STATE | RAID GROUP | ~404 |
|---|---|---|---|
| CNF | MOUNTED | RAID#CNF | ~2601-1 |
| DATA-11 | MOUNTED | RAID#DATA-1 | ~2601-2 |
| DATA-12 | MOUNTED | RAID#DATA-1 | ~2601-3 |
| DATA-21 | MOUNTED | RAID#DATA-2 | ~2601-4 |
| DATA-22 | MOUNTED | RAID#DATA-2 | ~2601-5 |
| : | : | : | |

FIG. 26D

| FILE SYSTEM NAME | MOUNT STATE | RAID GROUP | ~404 |
|---|---|---|---|
| CNF | MOUNTED | RAID#CNF | ~2601-1 |
| DATA-11 | MOUNTED | RAID#DATA-1 | ~2601-2 |
| DATA-12 | MOUNTED | RAID#DATA-1 | ~2601-3 |
| DATA-21 | UNMOUNTED | RAID#DATA-2 | ~2601-4 |
| DATA-22 | UNMOUNTED | RAID#DATA-2 | ~2601-5 |
| : | : | : | |

FIG. 26E

| FILE SYSTEM NAME | MOUNT STATE | RAID GROUP | ~404 |
|---|---|---|---|
| CNF | MOUNTED | RAID#CNF | ~2601-1 |
| DATA-11 | MOUNTED | RAID#DATA-1 | ~2601-2 |
| DATA-12 | MOUNTED | RAID#DATA-1 | ~2601-3 |
| DATA-21 | MOUNTED | RAID#DATA-2 | ~2601-4 |
| DATA-22 | MOUNTED | RAID#DATA-2 | ~2601-5 |
| : | : | : | |

FIG. 27A

| DISK NAME | VENDER NAME | FIRM VERSION NUMBER | RAID GROUP NAME | |
|---|---|---|---|---|
| Disk#00 | COMPANY A | AA09 | RAID#CNF | ~402 |
| Disk#01 | COMPANY A | AA09 | RAID#CNF | ~2701-1 |
| Disk#02 | COMPANY F | FA88 | RAID#DATA-1 | ~2701-2 |
| Disk#03 | COMPANY F | FA88 | RAID#DATA-1 | ~2701-3 |
| Disk#04 | COMPANY F | FA88 | RAID#DATA-2 | ~2701-4 |
| Disk#05 | COMPANY F | FA88 | RAID#DATA-2 | ~2701-5 |
| Disk#06 | COMPANY F | FA88 | RAID#DATA-2 | ~2701-6 |
| ⋮ | ⋮ | ⋮ | ⋮ | ~2701-7 |

FIG. 27B

| DISK NAME | VENDER NAME | FIRM VERSION NUMBER | RAID GROUP NAME | |
|---|---|---|---|---|
| Disk#00 | COMPANY A | AA09 | RAID#CNF | ~402 |
| Disk#01 | COMPANY A | AA09 | RAID#CNF | ~2701-1 |
| Disk#02 | COMPANY F | FA99 | RAID#DATA-1 | ~2701-2 |
| Disk#03 | COMPANY F | FA99 | RAID#DATA-1 | ~2701-3 |
| Disk#04 | COMPANY F | FA88 | RAID#DATA-2 | ~2701-4 |
| Disk#05 | COMPANY F | FA88 | RAID#DATA-2 | ~2701-5 |
| Disk#06 | COMPANY F | FA88 | RAID#DATA-2 | ~2701-6 |
| ⋮ | ⋮ | ⋮ | ⋮ | ~2701-7 |

FIG. 27C

| DISK NAME | VENDER NAME | FIRM VERSION NUMBER | RAID GROUP NAME | |
|---|---|---|---|---|
| Disk#00 | COMPANY A | AA09 | RAID#CNF | ~402 |
| Disk#01 | COMPANY A | AA09 | RAID#CNF | ~2701-1 |
| Disk#02 | COMPANY F | FA99 | RAID#DATA-1 | ~2701-2 |
| Disk#03 | COMPANY F | FA99 | RAID#DATA-1 | ~2701-3 |
| Disk#04 | COMPANY F | FA99 | RAID#DATA-2 | ~2701-4 |
| Disk#05 | COMPANY F | FA99 | RAID#DATA-2 | ~2701-5 |
| Disk#06 | COMPANY F | FA99 | RAID#DATA-2 | ~2701-6 |
| ⋮ | ⋮ | ⋮ | ⋮ | ~2701-7 |

STORAGE CONTROL DEVICE TO CONTROL STORAGE DEVICES OF A FIRST TYPE AND A SECOND TYPE

CROSS-REFERENCE TO RELATED APPLICATION

This application is based upon and claims the benefit of priority of the prior Japanese Patent Application No. 2015-034596, filed on Feb. 24, 2015, the entire contents of which are incorporated herein by reference.

FIELD

The embodiment discussed herein is related to a storage control device.

BACKGROUND

Firmware of a storage device may be updated in order to cope with failure of the storage device or to add a new function to the storage device. An example of related art includes a technique in which, when a command to update firmware of a disk device is received, a disk device of which firmware is to be updated is designated on the basis of contents of the command to update firmware and the designated disk device is disconnected to be temporarily degenerated. Another example includes a technique in which first and second disk control units operable in parallel are included, and firmware of the first disk control unit is updated while the second disk control unit executes a command in place of the first disk control unit.

Related techniques are disclosed in, for example, Japanese Laid-open Patent Publication No. 2009-075716 and Japanese Laid-open Patent Publication No. 2010-117970.

However, according to the related arts, performance of access to data of a first type storage device may be degraded while firmware of a plurality of a second type storage devices serving as caches of the first type storage device is being updated. Specifically, for example, a request to access data of the first type storage device, which is temporarily stored in a certain storage device among the plurality of second type storage devices, may be generated while firmware of the certain storage device is being updated. In this case, since the certain storage device is unavailable, the data of the first type storage device is not cached and access performance is degraded.

SUMMARY

According to an aspect of the present invention, provided is a storage control device including a processor. The processor is configured to classify second type storage devices into a first group and a second group. The second type storage devices temporarily store thereof data held in a first type storage device. The processor is configured to access the first type storage device using storage devices belonging to the second group while updating firmware of storage devices belonging to the first group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of stored contents of an LV information table;

FIG. 6 is a diagram illustrating an example of stored contents of a disk information table;

FIG. 13 is a diagram illustrating an example of an LV processing priority in a first half part;

FIG. 14 is a diagram illustrating an example of an LV processing priority in a second half part;

FIGS. 15A to 15C are diagrams illustrating an example of a method of grouping;

FIGS. 18A and 18B are diagrams illustrating an example of an operation in a read process in a first half part;

FIGS. 19A and 19B are diagrams illustrating an example of an operation in a read process in a second half part;

FIGS. 20A and 20B are diagrams illustrating an example of an operation in a reorganization process in a first half part;

FIGS. 21A and 21B are diagrams illustrating an example of an operation in a reorganization process in a second half part;

FIGS. 22A to 22D are diagrams illustrating an example of updating stored contents of an LV information table in response to processing on an LV with priority "1";

FIGS. 23A to 23E are diagrams illustrating an example of updating stored contents of an LV information table in response to processing on an LV with priority "2";

FIGS. 24A to 24E are diagrams illustrating an example of updating stored contents of an LV information table in response to processing on an LV with priority "3";

FIGS. 25A to 25E are diagrams illustrating an example of updating stored contents of an LV information table in response to processing on an LV with priority "4";

FIGS. 26A to 26E are diagrams illustrating an example of updating stored contents of a file system information table before and after firm application;

FIGS. 27A to 27C are diagrams illustrating an example of updating stored contents of a disk information table before and after firm application;

DESCRIPTION OF EMBODIMENT

An Embodiment of the storage control device will be described in detail with reference to the drawings.

Figure 1B:
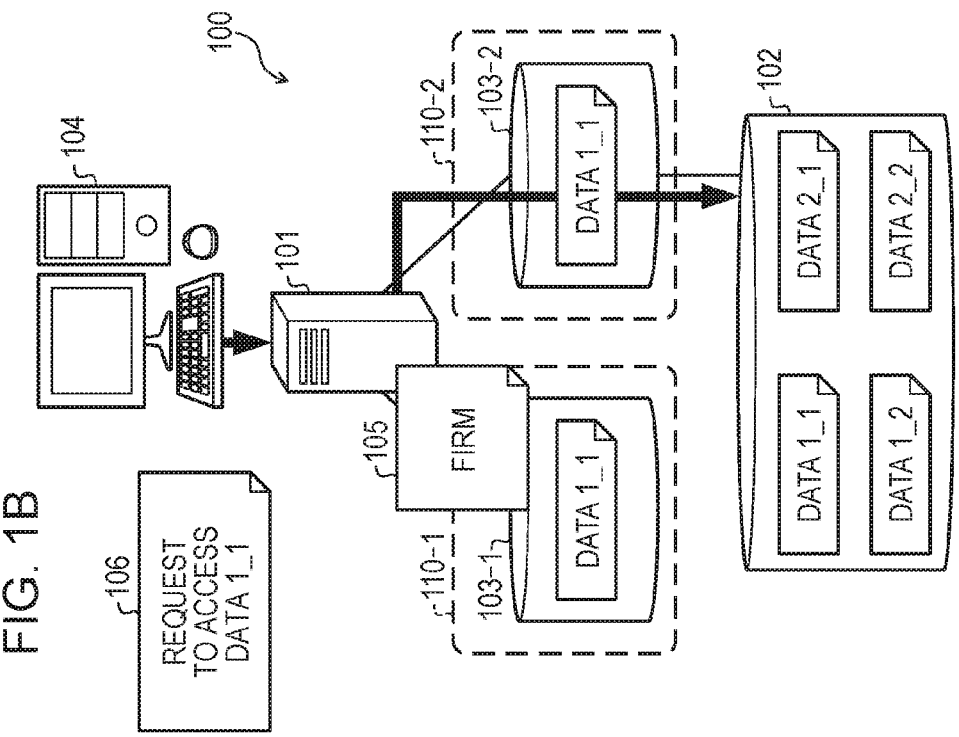
FIGS. 1A and 1B are diagrams illustrating an example of an operation of a storage control device according to an embodiment.
Figure 1A:
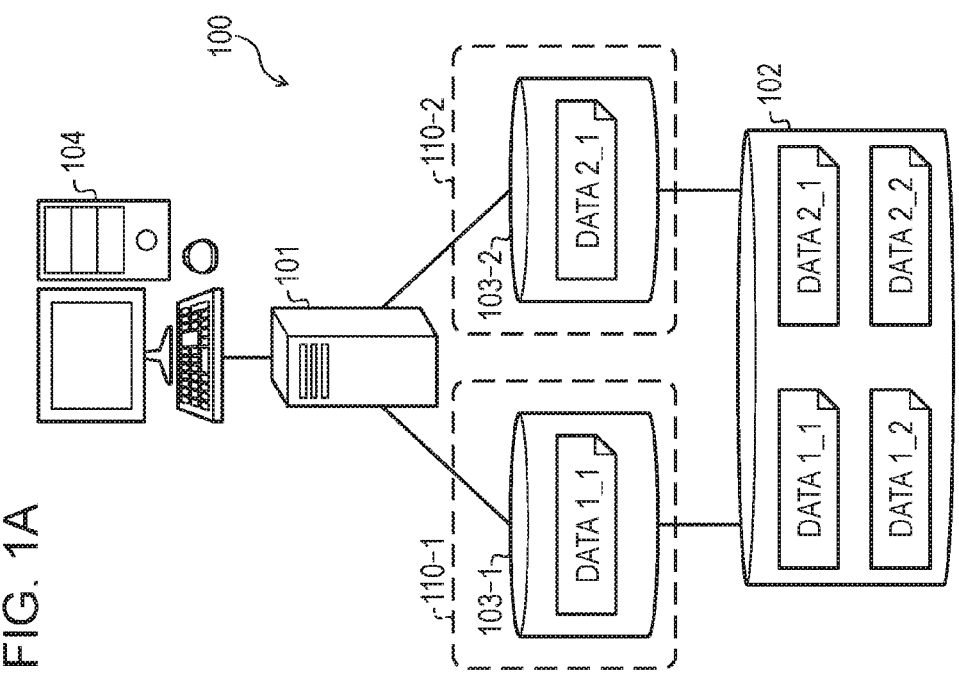

FIGS. 1A and 1B are diagrams illustrating an example of an operation of a storage control device 101 according to the present embodiment. The storage control device 101 is a computer that controls a first type storage device 102 and a plurality of second type storage devices 103-1 and 103-2 that temporarily store therein data held in the first type storage device 102. The storage control device 101 is, for example, a server. The storage control device 101 is included in a storage system 100 including the first type storage device 102 and the second type storage devices 103-1 and 103-2. The storage control device 101 is connected to a host device 104. The host device 104 is a device operated by a user who uses the storage system 100, and is an upper-level device for the storage control device 101.

The second type storage devices 103-1 and 103-2 are prepared to improve the performance of the storage system 100, and operate as a cache that temporarily stores therein the data held in the first type storage device 102. Therefore, as long as the second type storage devices have a higher access performance than the first type storage device, the first type storage device and the second type storage devices may be any storage devices.

For example, the first type storage device is a device that stores therein data using a magnetic tape, that is, a tape library device, whereas the second type storage devices are devices that store therein data using a magnetic disk, that is, hard disk drives (HDDs). Further, the first type storage device may be a tape library device, whereas the second type storage devices may be solid state drives (SSDs). Further, the second type storage devices are SSDs, whereas the first type storage device may be an HDD.

Each of the second type storage devices 103-1 and 103-2 may be a physical disk or may be a logical disk. As a logical disk, for example, each of the second type storage devices 103-1 and 103-2 may be a disk formed of a redundant array of inexpensive disks (RAID).

During an operation of the storage system 100, firmware of the second type storage devices 103-1 and 103-2 may be updated. For example, when a failure is found in the second type storage devices 103-1 and 103-2, a manufacturer of the second type storage devices 103-1 and 103-2 may provide firmware for solving the failure. Further, the manufacturer of the second type storage devices 103-1 and 103-2 may provide firmware having a new function to the second type storage devices 103-1 and 103-2. An administrator of the storage system 100 applies the provided firmware to the second type storage devices 103-1 and 103-2 to update the firmware of the second type storage devices 103-1 and 103-2.

The firmware of the second type storage devices 103-1 and 103-2 is software for controlling the second type storage devices 103-1 and 103-2. For example, the firmware of the second type storage devices 103-1 and 103-2 is an operating system (OS) executed by central processing units (CPUs) of the second type storage devices 103-1 and 103-2. When the second type storage devices 103-1 and 103-2 are controlled by a programmable logic device (PLD), for example, the firmware of the second type storage devices 103-1 and 103-2 may be circuit information for determining a logic circuit of the PLD.

The performance of access to the first type storage device 102 may be degraded while the firmware of the second type storage devices 103-1 and 103-2 is being updated. For example, if the firmware of the second type storage devices 103-1 and 103-2 is updated together, the second type storage devices 103-1 and 103-2 are unmounted and the second type storage devices 103-1 and 103-2 are unable to be operated as the cache.

Further, when the firmware of the second type storage device 103-1 is updated, the second type storage device 103-1 is unmounted and the second type storage device 103-1 is unable to be operated as a cache. In this state, a request to access the data of the first type storage device 102, which is temporarily stored in the second type storage device 103-1, may be made. In this case, since it is not possible to access the second type storage device 103-1, the data of the first type storage device 102 is not cached and the access performance is degraded.

Therefore, the storage control device 101 classifies the plurality of disks serving as caches of the first type storage device 102 into a group to be first applied with the firmware and a group to be accessed, and performs processing in parallel. Accordingly, the storage control device 101 may suppress the degradation of the access performance of the storage system 100 which is under application of the firmware.

Hereinafter, for simplicity of description, "firmware" may be simply referred to as "firm". Further, "update of firmware" may be simply referred to as "application of firm" or "firm application". Further, "a first half part of the firm application" is simply referred to as "a first half part". Similarly, "a second half part of the firm application" is simply referred to as "a second half part".

An operation of the storage control device 101 will be described in detail with reference to FIGS. 1A and 1B. FIG. 1A illustrates a state before the firm application. The first type storage device 102 holds data 1_1, data 1_2, data 2_1, and data 2_2. The data 1_1 and data 1_2 are associated with the second type storage device 103-1. In the state of FIG. 1A, the second type storage device 103-1 holds the data 1_1. Further, the data 2_1 and data 2_2 are associated with the second type storage device 103-2. In the state of FIG. 1A, the second type storage device 103-2 holds the data 2_1. As a specific method of association, the storage control device 101 may access a storage unit that holds information for identifying each of the data held in the first type storage device 102 in association with the second type storage device 103-1 or 103-2. The information for identifying each of the data held in the first type storage device 102 includes, for example, a name of each of the data or a file path thereof.

In FIG. 1A, the storage control device 101 classifies the second type storage devices 103-1 and 103-2 into a first group 110-1 and a second group 110-2. When the storage control device 101 classifies the second type storage devices 103-1 and 103-2 into the first group 110-1 and the second group 110-2, the storage control device 101 may classify the storage devices in an arbitrary way as long as there is no empty group. A more specific method of classifying the storage devices into the groups will be described later with reference to FIG. 15. In FIG. 1A, the storage control device 101 classifies the second type storage device 103-1 into the first group 110-1, and the second type storage device 103-2 into the second group 110-2.

Next, in FIG. 1B, in the first half part, the second type storage device 103-1 belonging to the first group 110-1 is assumed to be under application of firm 105. In this case, the storage control device 101 accesses the first type storage device 102 using the second type storage device 103-2 belonging to the second group 110-2. Here, a trigger of the access may be, for example, an access request from the host device 104. Further, a trigger of the access may be, for example, occurrence of a process of moving, in the first type storage device 102, data serving as a cache source of data temporarily held in any one of the second type storage devices 103-1 and 103-2.

In the example of FIG. 1B, the host device 104 is assumed to issue a request 106 to access the data 1_1 to the storage control device 101 while the second type storage device 103-1 is under firm application. In this case, the storage control device 101 accesses the first type storage device 102 using the second type storage device 103-2. More specifically, the storage control device 101 stores the data 1_1 in the second type storage device 103-2, and processes the request 106 to access the data 1_1. Next, an example in which the storage system 100 is applied to a virtual tape library system 200 will be described with reference to FIG. 2.

Figure 2:
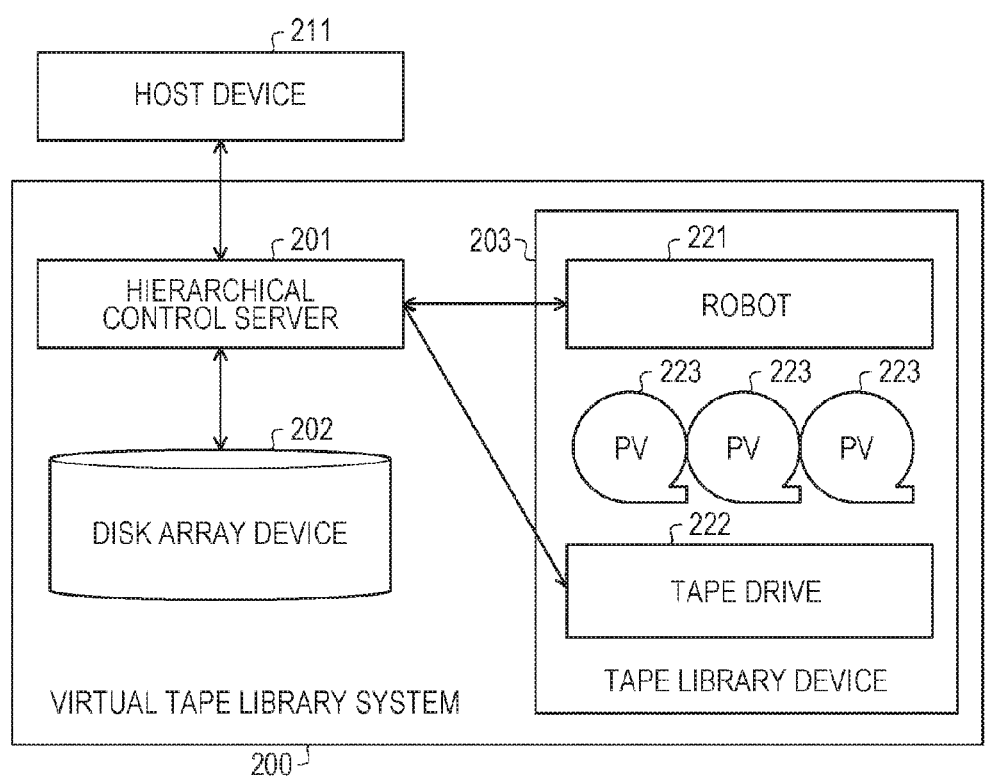
FIG. 2 is a diagram illustrating an example of a configuration of a virtual tape library system.

FIG. 2 is a diagram illustrating an example of a configuration of the virtual tape library system 200. The virtual tape library system 200 is a system that provides a virtual service of a tape library. The virtual tape library system 200 includes a hierarchical control server 201, a disk array device 202, and a tape library device 203. The virtual tape library system 200 is connected to a host device 211 which uses the virtual tape library system 200.

The hierarchical control server 201 corresponds to the storage control device 101 illustrated in FIGS. 1A and 1B. The disk array device 202 corresponds to the plurality of second type storage devices 103-1 and 103-2 illustrated in FIGS. 1A and 1B. The tape library device 203 corresponds to the first type storage device 102 illustrated in FIGS. 1A and 1B. The host device 211 corresponds to the host device 104 illustrated in FIGS. 1A and 1B.

The virtual tape library system 200 acts as a tape library for the host device 211. The tape library device 203 includes a robot 221, a tape drive 222, and physical volumes (PVs) 223.

The hierarchical control server 201 is a device that controls the entire virtual tape library system 200. Specifically, the hierarchical control server 201 performs reading or writing of data using the disk array device 202 in response to a read request or a write request from the host device 211.

More specifically, when there is a write request from the host device 211, the hierarchical control server 201 performs the writing to the disk array device 202 and notifies the host device 211 of a response. Thus, the virtual tape library system 200 is capable of performing processing faster as compared to a case in which an actual tape library is used. The hierarchical control server 201 stores the data, which has been written to the disk array device 202, in the tape library device 203 in the background without the host device 211. A process of storing data, which has been written to the disk array device 202, in the tape library device 203 is referred to as a "migration process". In the migration process, when the hierarchical control server 201 writes updated data in a PV, the hierarchical control server 201 invalidates an area in the PV in which old data is written, and stores the updated data in an area next to a currently used area.

The disk array device 202 is a cache for the tape library device 203, and is also referred to as a tape volume cache (TVC). The data written to the disk array device 202 is referred to as a logical volume (LV). The hierarchical control server 201 erases, from the disk array device 202, an LV which is not frequently updated and already migrated to a PV, so as to reduce oppression of the capacity due to the LVs written to the disk array device 202.

When the target data of the read request or the write request from the host device 211 exists in the disk array device 202, the hierarchical control server 201 reads or writes the data from or to the disk array device 202 and returns a response to the host device 211. Presence of the target data of the read request or the write request from the host device 211 in the disk array device 202 is referred to as "on cache".

On the other hand, when the target data of the read request or the write request from the host device 211 does not exist in the disk array device 202, the hierarchical control server 201 controls the robot 221 to insert a PV 223 which holds the target data into the tape drive 222. The hierarchical control server 201 reads, from the tape drive 222, the PV 223 which has been migrated, transfers the data to the disk array device 202, and returns a response to the host device 211. Absence of the target data of the read request or the write request from the host device 211 in the disk array device 202 is referred to as "off cache". A process of reading data from a PV 223 to an LV is referred to as a "recall process". Next, a hardware configuration of the hierarchical control server 201 will be described with reference to FIG. 3.

Figure 3:
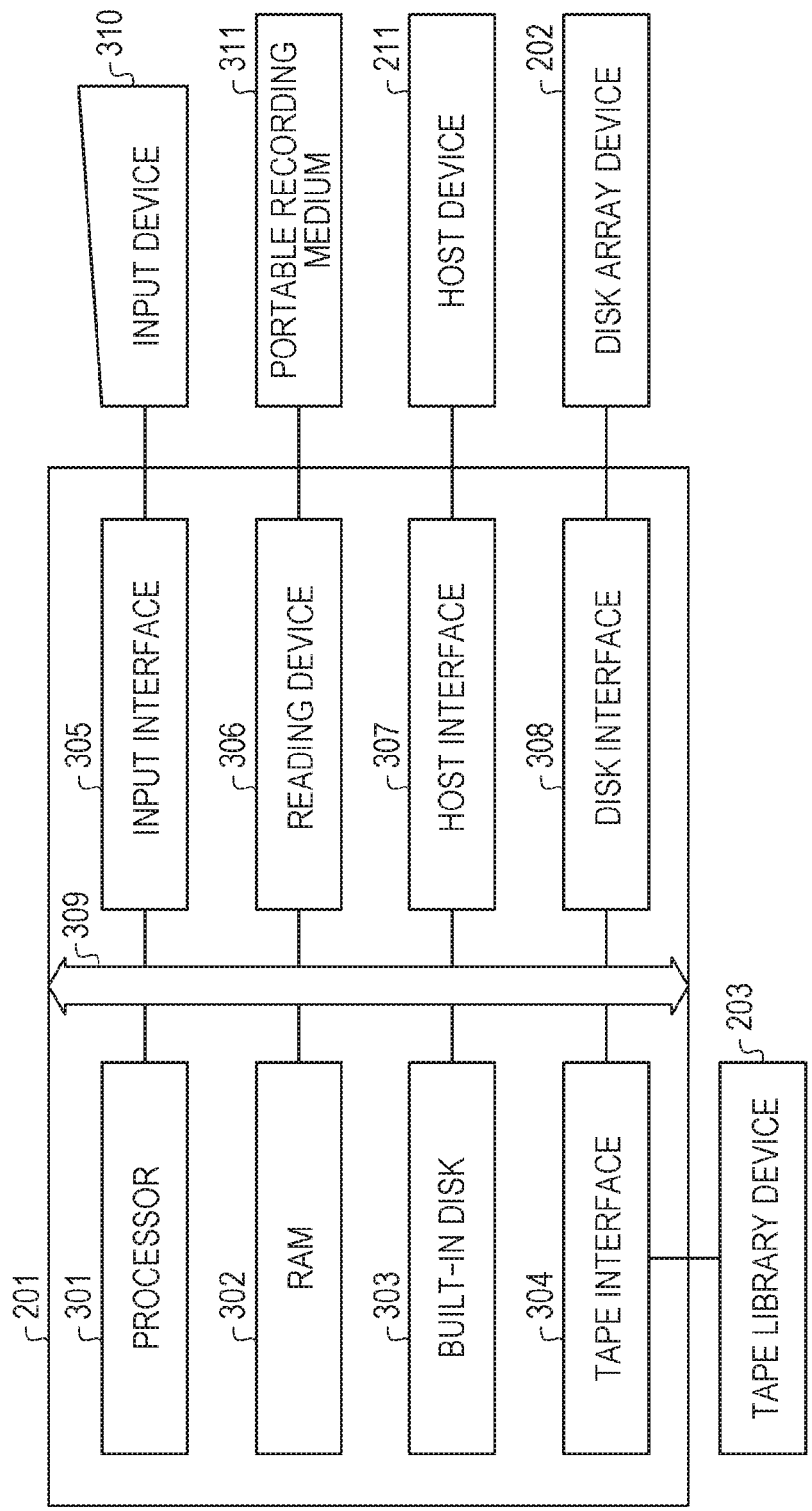
FIG. 3 is a diagram illustrating an example of a hardware configuration of a hierarchical control server.

FIG. 3 is a diagram illustrating an example of a hardware configuration of the hierarchical control server 201. The hierarchical control server 201 includes a processor 301, a random access memory (RAM) 302, a built-in disk 303, a tape interface 304, an input interface 305, a reading device 306, a host interface 307, and a disk interface 308. These components are connected to each other by a bus 309.

The processor 301 controls the entire hierarchical control server 201. The processor 301 is, for example, a CPU, a micro processing unit (MPU), a digital signal processor (DSP), an application specific integrated circuit (ASIC), or a PLD.

The RAM 302 is a primary storage device of the hierarchical control server 201, and is a volatile memory used as a work area of the processor 301. The built-in disk 303 is a secondary storage device of the hierarchical control server 201. For example, a firmware program and various data are stored in the built-in disk 303. For example, for the built-in disk 303, a non-volatile storage device such as an SSD or an HDD may be adopted.

The tape interface 304 is a communication interface for transmitting and receiving data to and from the tape library device 203. The input interface 305 is an interface for connecting an input device 310. For example, the input device 310 having various operation keys may be connected.

The reading device 306 is a device for reading data from a portable recording medium 311. The reading device 306 transmits the read data to the processor 301. The portable recording medium 311 is, for example, an optical disc, a magneto-optical disc, or a semiconductor memory.

The host interface 307 is a communication interface for transmitting and receiving data to and from the host device 211. The disk interface 308 is a communication interface for transmitting and receiving data to and from the disk array device 202.

Figure 4:
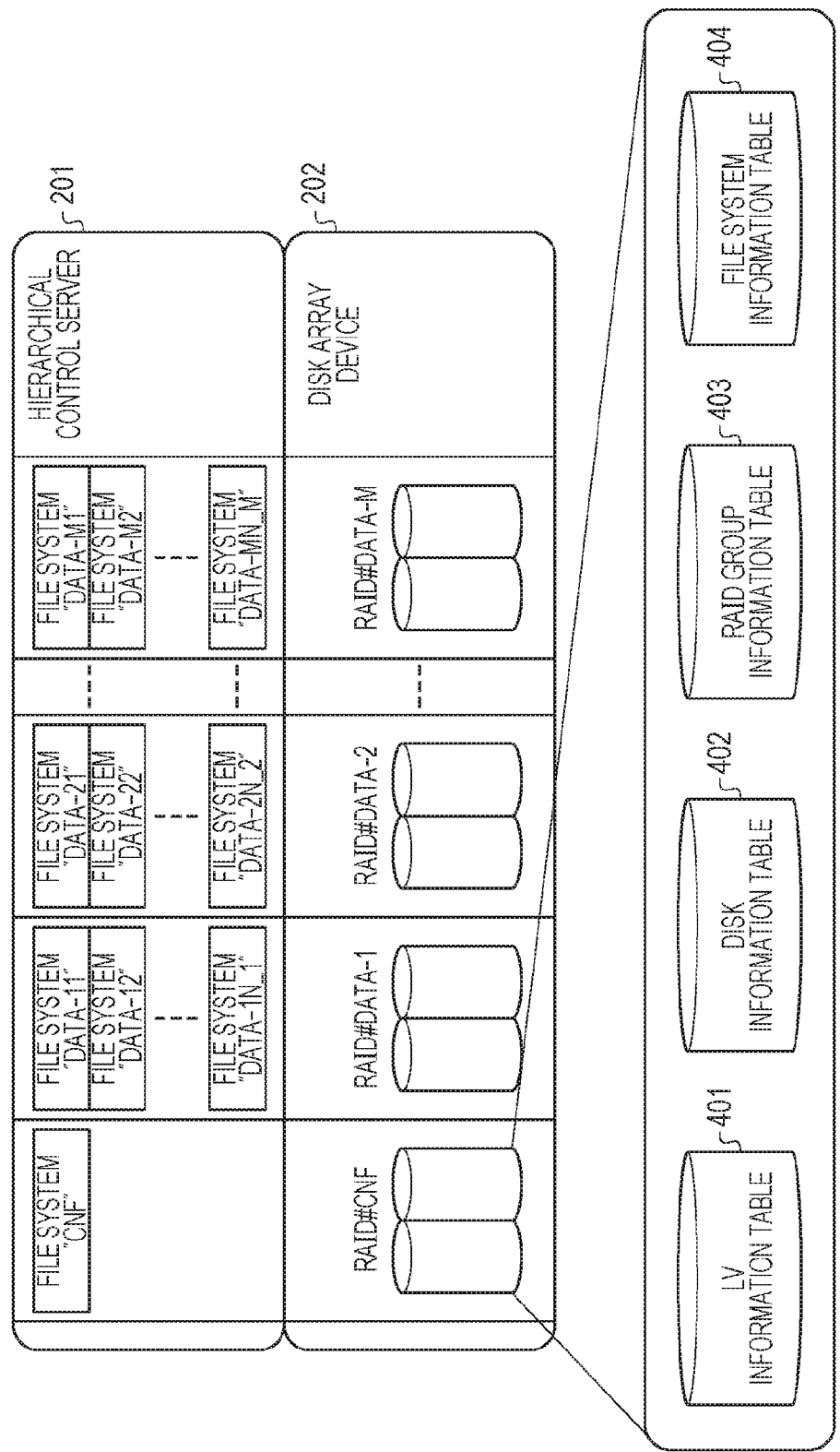
FIG. 4 is a diagram illustrating a file system of a virtual tape library system.

FIG. 4 is a diagram illustrating a file system of the virtual tape library system 200. In the disk array device 202, one or more file systems are created for each RAID group. One of the RAID groups corresponds to one of the plurality of second type storage devices 103 illustrated in FIGS. 1A and 1B. By forming a RAID group, in the disk array device 202, even when data is not read from one of the disks forming the RAID group, the data may be restored from the other disks. Accordingly, it is possible to improve the reliability of the data.

In an exemplary configuration of the file system, for example, one file system is created in the RAID group RAID#CNF created to store configuration data of the virtual tape library system 200. In the RAID group RAID#DATA-M created to store user data, which is data of the user of the host device 211, N_M file systems are created in each RAID group. Here, N and M are integers equal to or greater than 1. N_1, N_2, . . . , N_M have independent values different from each other or happen to be the same. The file system is mounted as DATA-MN_M on the hierarchical control server 201.

DATA-MN_M may be referred to as a "user area". In contrast, RAID#CNF may be referred to as a "control area".

RAID#CNF includes an LV information table 401, a disk information table 402, a RAID group information table 403, and a file system information table 404 in order to manage the virtual tape library system 200. Details of the LV information table 401 will be described with reference to FIG. 5. Details of the disk information table 402 will be described with reference to FIG. 6. Details of the RAID group information table 403 will be described with reference to FIG. 7. Details of the file system information table 404 will be described with reference to FIG. 8.

FIG. 5 is a diagram illustrating an example of stored contents of the LV information table 401. The LV information table 401 is a table for managing LVs. The LV information table 401 illustrated in FIG. 5 holds records 501-1 to 501-7.

Each record of the LV information table 401 includes fields of "LV name", "file system name", "LV capacity", "state", and "PV name". A name of an LV is stored in the "LV name" field. A name of a file system to which the LV belongs is stored in the "file system name" field. A value of the storage capacity of the LV is stored in the "LV capacity" field. A state of the LV is stored in the "state" field. The states of the LV include, specifically, "on cache", "off cache", "under recall process", "under migration process", "under reorganization process", "under append write process", "under read process", and the like.

The reorganization is a process of decreasing an unavailable area and increasing an available PV area in the virtual tape library system 200 by performing the migration process from an LV to a PV several times. In some cases, the number of in-use PVs may also be increased by performing the reorganization process. The unavailable area is an area in the PV to which old data is held after the migration process. The reorganization process is substantially a process of recalling an LV from the target PV and migrating the LV to a new PV. A name of a PV, in which the LV is held, is stored in the "PV name" field.

For example, the record 501-1 indicates that an LV A00000 belongs to a file system DATA-11, the capacity of the LV is 1000000 [Byte], the state is "on cache", and the LV has been migrated to a PV TVXQ00.

FIG. 6 is a diagram illustrating an example of stored contents of the disk information table 402. The disk information table 402 is a table for managing disks in the disk array device 202. The disk information table 402 illustrated in FIG. 6 holds records 601-1 to 601-7.

Each record of the disk information table 402 includes fields of "disk name", "vendor name", "firm version number", and "RAID group name". A name of a disk is stored in the "disk name" field. A name of a vendor that has manufactured the disk is stored in the "vendor name" field. A version number of the firm of the running disk is stored in the "firm version number" field. A name of a RAID group to which the disk belongs is stored in the "RAID group name" field.

For example, the record 601-1 indicates that a disk "Disk#00" has been manufactured by a vender "Company A", the version number of the firm of the disk is "AA09", and the disk belongs to a RAID group RAID#CNF.

Figure 7:
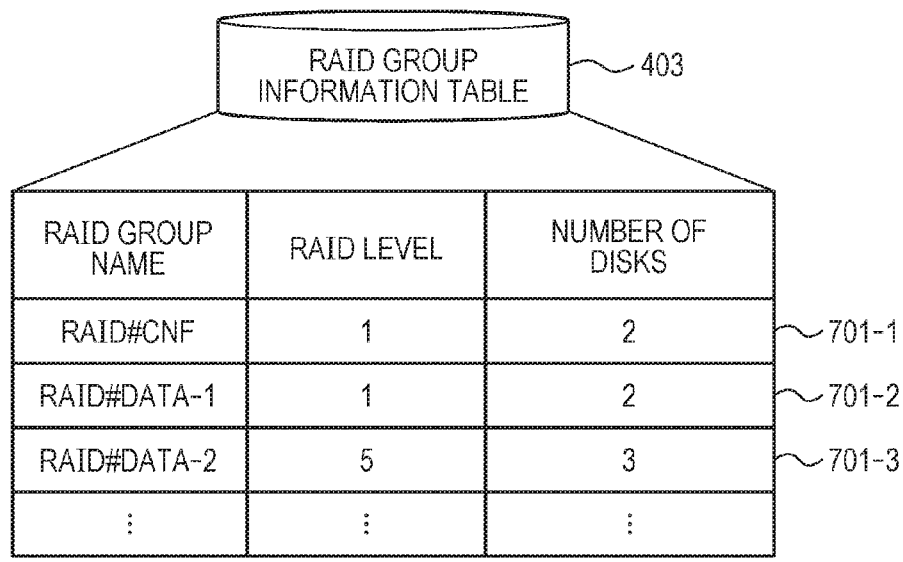
FIG. 7 is a diagram illustrating an example of stored contents of a RAID group information table.

FIG. 7 is a diagram illustrating an example of stored contents of the RAID group information table 403. The RAID group information table 403 is a table for managing RAID groups in the disk array device 202. The RAID group information table 403 illustrated in FIG. 7 holds records 701-1 to 701-3.

Each record of the RAID group information table 403 includes fields of "RAID group name", "RAID level", and "number of disks". A name of a RAID group is stored in the "RAID group name" field. A RAID level of the RAID group is stored in the "RAID level" field. The number of disks belonging to the RAID group is stored in the "number of disks" field.

For example, the record 701-1 indicates that a RAID group RAID#CNF is a RAID group of a RAID level "1", and "2" disks belong to the RAID group.

Figure 8:
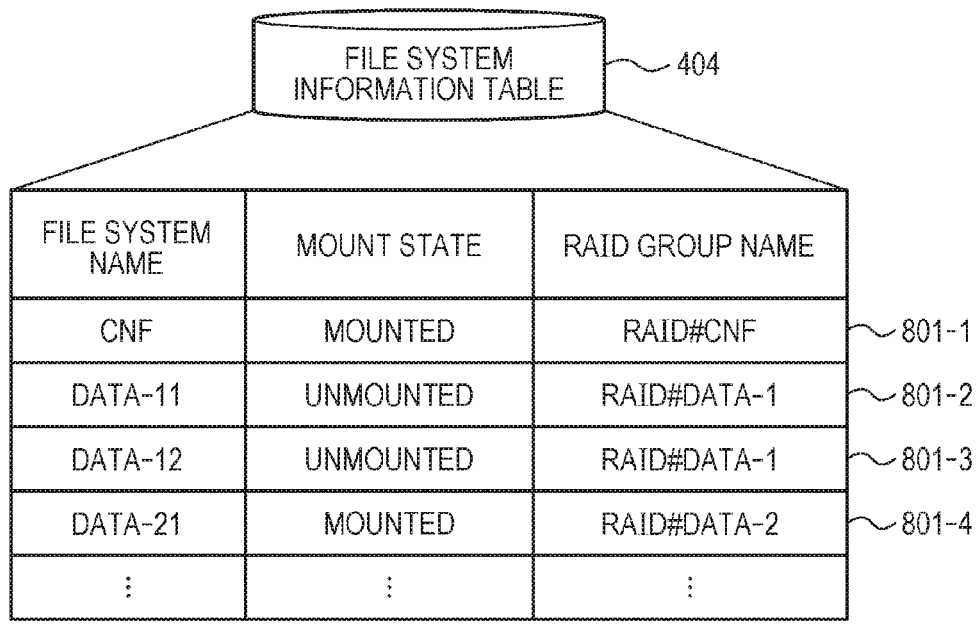
FIG. 8 is a diagram illustrating an example of stored contents of a file system information table.

FIG. 8 is a diagram illustrating an example of stored contents of the file system information table 404. The file system information table 404 is a table for managing file systems in the disk array device 202. The file system information table 404 illustrated in FIG. 8 holds records 801-1 to 801-4.

Each record of the file system information table 404 includes fields of "file system name", "mount state", and "RAID group name". A name of a file system is stored in the "file system name" field. An identifier indicating whether or not the file system is mounted on the hierarchical control server 201 is stored in the "mount state2 field. Specifically, any one of "Mounted" indicating that the file system is mounted or "Unmounted" indicating that the file system is not mounted is stored in the "mount state" field. A name of a RAID group corresponding to the file system is stored in the "RAID group name" field.

Next, operations of an append write process, a read process, and a reorganization process as processes performed on an LV according to the present embodiment will be described with reference to FIGS. 9A to 11B.

Figure 9A:
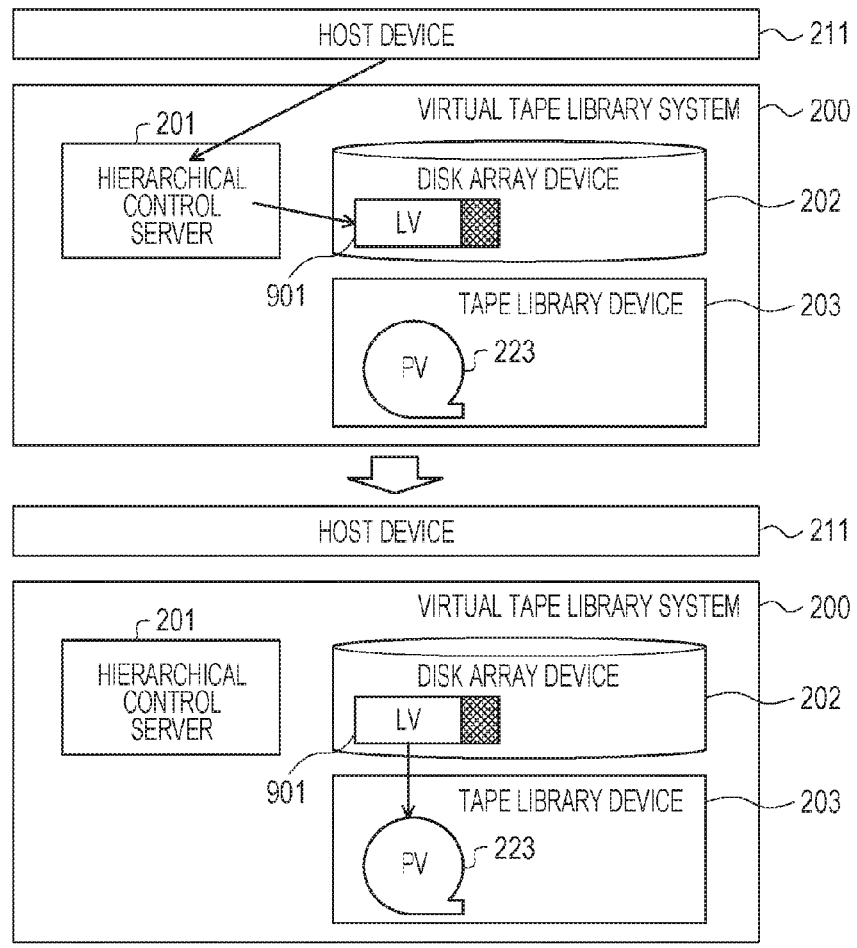
FIGS. 9A and 9B are diagrams illustrating an example of an operation in an append write process to a PV.
Figure 9B:
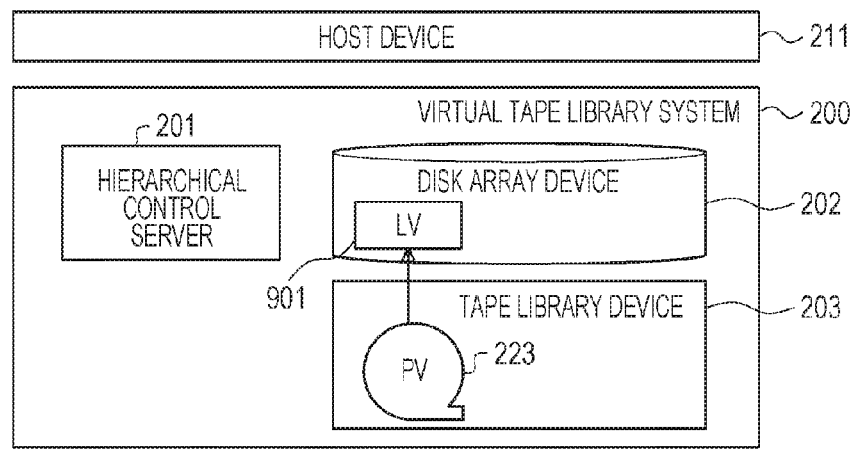

FIGS. 9A and 9B are diagrams illustrating an example of an operation in the append write process to a PV. Regarding the append write process, an operation of the virtual tape library system 200 is different depending on a state of the target data, that is, "on cache" or "off cache". The append write process to a PV in the "on cache" state will be described with reference to in FIG. 9A, and the append write process to a PV in the "off cache" state will be described with reference to in FIG. 9B.

In FIG. 9A, in the case of the "on cache", the hierarchical control server 201 writes data to an LV 901 of the disk array device 202. In FIG. 9A, a hatched portion is a sequential written portion. The hierarchical control server 201 performs the migration process on the entire LV 901. Here, the hierarchical control server 201 deletes data held in the PV which corresponds to a white portion of the LV 901 before performing the migration process. Specifically, the hierarchical control server 201 invalidates an area to which data corresponding to the white portion of the LV 901 is written.

In FIG. 9B, in the case of "off cache", the hierarchical control server 201 first performs the recall process. Subsequently, the hierarchical control server 201 performs a similar process as in the case of the "on cache".

Figure 10A:
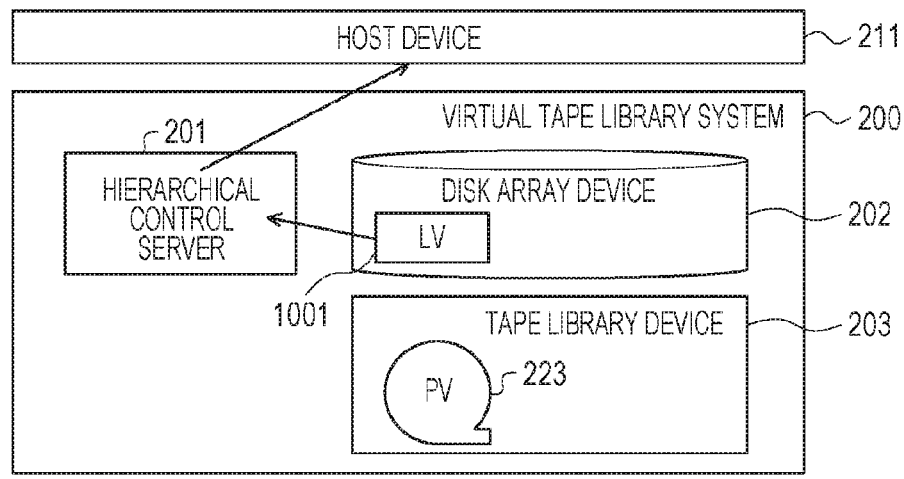
FIGS. 10A and 10B are diagrams illustrating an example of an operation in a read process from an LV.
Figure 10B:
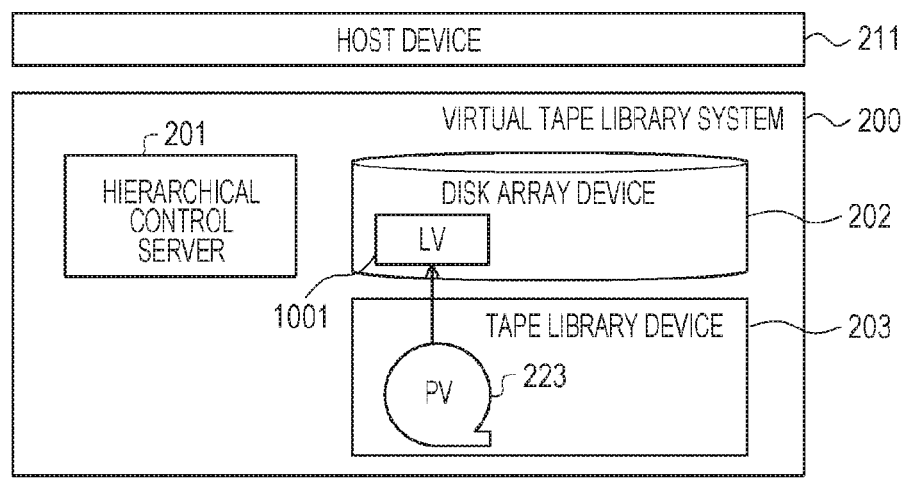

FIGS. 10A and 10B are diagrams illustrating an example of an operation in the read process from an LV. Regarding the read process, an operation of the virtual tape library system 200 is different depending on a state of the target data, that is, "on cache" or "off cache". The read process from an LV in the "on cache" state will be described with reference to FIG. 10A, and the read process from an LV in the "off cache" state will be described with reference to FIG. 10B.

In FIG. 10A, in the case of the "on cache", the hierarchical control server 201 reads data from the LV 1001 in accordance with a read request from the host device 211, and returns the read data to the host device 211.

In FIG. 10B, in the case of the "off cache", the hierarchical control server 201 first performs the recall process. Subsequently, the hierarchical control server 201 performs a similar process as in the case of the "on cache".

Figure 11A:
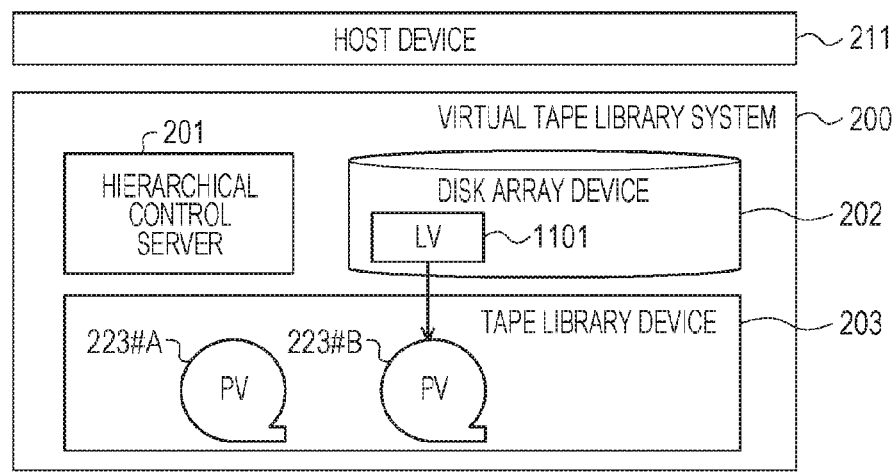
FIGS. 11A and 11B are diagrams illustrating an example of an operation in a reorganization process.
Figure 11B:
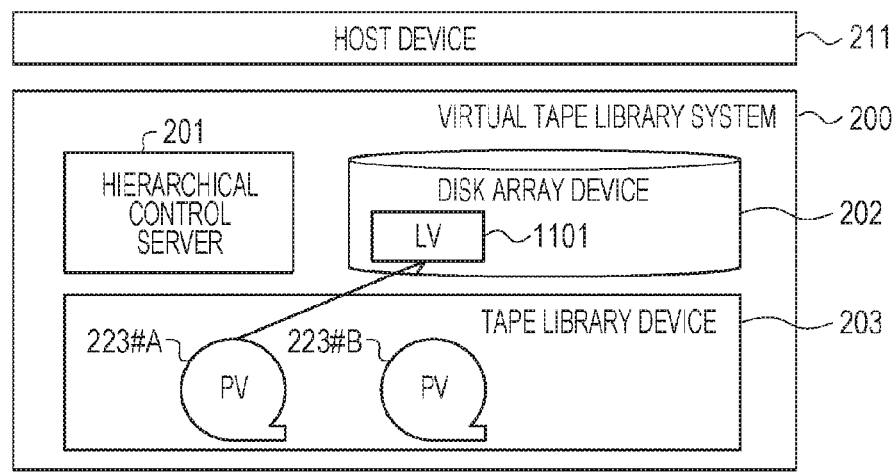

FIGS. 11A and 11B are diagrams illustrating an example of an operation in the reorganization process. Regarding the reorganization process, an operation of the virtual tape library system 200 is different depending on a state of the target data, that is, "on cache" or "off cache". The reorganization process in the "on cache" state will be described with reference to FIG. 11A, and the reorganization process in the "off cache" state will be described with reference to FIG. 11B.

In FIG. 11A, in the case of the "on cache", the hierarchical control server 201 performs the migration process of migrating an LV 1101, which holds data identical to data held in PV 223#A, to PV 223#B.

In FIG. 11B, in the case of the "off cache", the hierarchical control server 201 first performs the recall process. Subsequently, the hierarchical control server 201 performs a similar process as in the case of the "on cache".

Figure 12:
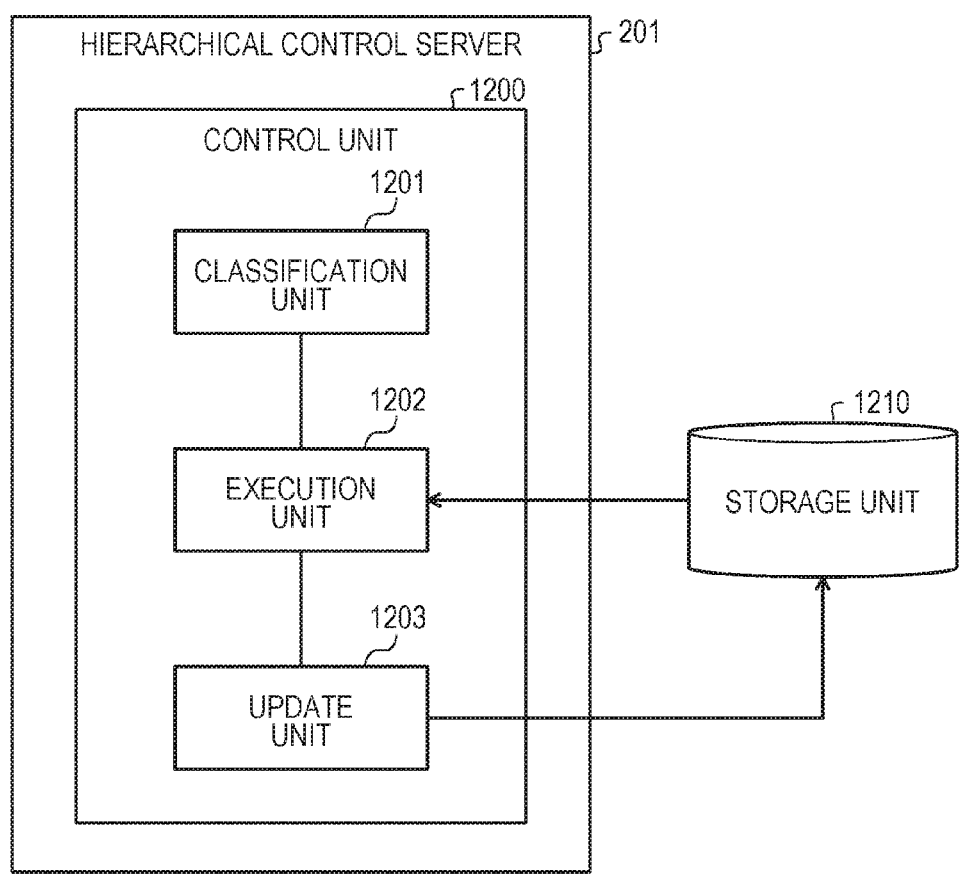
FIG. 12 is a diagram illustrating an example of a functional configuration of a hierarchical control server.

FIG. 12 is a diagram illustrating an example of a functional configuration of the hierarchical control server 201. The hierarchical control server 201 includes a control unit 1200. The control unit 1200 includes a classification unit 1201, an execution unit 1202, and an update unit 1203. The processor 301 executes a program stored in a storage device to realize a function of each unit of the control unit 1200. The storage device is, for example, the RAM 302 or the built-in disk 303 illustrated in FIG. 3. A result of processing of each unit is stored in, for example, a register of the processor 301 or a cache memory of the processor 301.

The hierarchical control server 201 may access a storage unit 1210. The storage unit 1210 corresponds to the control area illustrated in FIG. 4. The storage unit 1210 may be stored in a storage device such as the RAM 302 or the built-in disk 303. The storage unit 1210 stores information indicating each of the plurality of RAID groups in association with information identifying each piece of data stored in the tape library device 203, that is, a PV. Referring to FIGS. 5 and 8, each RAID group is associated with a file system name, as indicated by the file system information table 404 illustrated in FIG. 8. A file system name is associated with a PV name, as indicated by the LV information table 401 illustrated in FIG. 5. Therefore, as illustrated in FIGS. 5 and 8, each RAID group is associated with a PV name.

The classification unit 1201 classifies the plurality of RAID groups into a first group and a second group. In the following description, the first group is referred to as "group A" and the second group is referred to as "group B". There may be a RAID group which belongs to neither group A nor group B among the plurality of RAID groups. In the present embodiment, the classification unit 1201 causes RAID#CNF to belong neither group A nor group B and does not perform the firm application of RAID#CNF.

The classification unit 1201 may perform the classification into group A and group B on the basis of a time taken for the processing on the data stored in each of the plurality of RAID groups and a time taken for the firm application of each of the RAID groups. Here, the processing on the data stored in each RAID group is processing on the on-cache LV. The classification unit 1201 may use a time specified in advance by a developer as the time taken for the processing on the on-cache LV or may selectively use the time specified in advance by the developer for each type of the processing on the data as the time taken for the processing on the on-cache LV. Further, the classification unit 1201 may use a time specified in advance by the developer or a value obtained by weighting the time specified in advance by the developer depending on a data size of the firm as the time taken for the firm application of each of the RAID groups.

For example, it is assumed that RAID#DATA-1 to RAID#DATA-3 are to be classified into groups and the time taken for the processing on the on-cache LV for RAID#DATA-1 to RAID#DATA-3 are 20 seconds, 10 seconds, and 10 seconds, respectively. It is also assumed that the time taken for the firm application of RAID#DATA-1 to RAID#DATA-3 are each 20 seconds, and the firm application may be performed of RAID#DATA-1 to RAID#DATA-3 in parallel. In this case, the classification unit 1201 classifies RAID#DATA-1 for which the time taken for the processing on the on-cache LV is equal to or greater than the time taken for the firm application into group B, and classifies other RAID#DATA-2 and RAID#DATA-3 into group A. A more specific classification method will be described with reference to FIG. 15.

The execution unit 1202 accesses the tape library device 203 using the RAID groups belonging to group B during the firm application of the RAID groups belonging to group A, that is, in the first half part.

In the first half part, the execution unit 1202 may perform the processing on the data stored in the RAID group belonging to group B prior to the processing on the data not stored in the RAID group belonging to group B. Here, the processing on the data not stored in the RAID group belonging to group B is the processing on the off-cache LV of group B or the processing on the LV associated with the RAID group that is not included in group B.

In the first half part, the execution unit 1202 may perform the processing on the data that is not stored in the RAID group belonging to group A prior to the processing on the data stored in the RAID group belonging to group A. Here, the processing on the data that is not stored in the RAID group belonging to group A is the processing on the off-cache LV of group A or the processing on the LV associated with the RAID group that is not included in group A.

Further, in the first half part, the execution unit 1202 may perform, by referring to the storage unit 1210, the processing on the data associated with the RAID group belonging to group B prior to the processing on the data associated with the RAID group belonging to group A. The processing on the data associated with the RAID group belonging to group B includes the processing on the on-cache LV of group B and the processing on the off-cache LV of group B. Similarly, the processing on the data associated with the RAID group belonging to group A includes the processing on the on-cache LV of group A and the processing on the off-cache LV of group A. The LV processing priority in the first half part is illustrated in FIG. 13. The LV processing priority in the second half part is illustrated in FIG. 14.

The firm application of the RAID group belonging to group A is assumed to have been completed. Thereafter, the execution unit 1202 accesses the tape library device 203 using the RAID group belonging to group A during the firm application of the RAID group belonging to group B, that is, in the second half part.

In the first half part, the update unit 1203 updates the storage unit 1210 when performing the processing on the data associated with the RAID group belonging to group A. Specifically, the update unit 1203 updates the data associated with the RAID group belonging to group A to be associated with the RAID group belonging to group B. The timing of the update may be the same as the timing of the processing on data associated with the RAID group belonging to group A, or may be before or after the timing of the processing. More specifically, the update unit 1203 updates the LV information table 401. Specific content of the update will be described later in detail with reference to FIGS. 24A to 25E.

FIG. 13 is a diagram illustrating an example of the LV processing priority in the first half part. A table 1300 indicates the LV processing priority in the first half part. The table 1300 includes records 1301-1 to 1301-4. The RAID group belonging to group A is a RAID group on which the firm application is first performed, and the RAID group belonging to group B is a RAID group on which I/O requested from the host device 211 is first performed. The priority in the table 1300 is assumed to be higher when having a smaller value. Processing on the LVs having the same priority is assumed to be performed in a time order of a request.

A reason of setting that the LV belonging to group B has a higher priority than that of the LV belonging to group A as indicated in the records 1301-1 to 1301-4 will be described. In the first half part, the hierarchical control server 201 performs the firm application on group A. Accordingly, the hierarchical control server 201 causes the processing on the LV belonging to group B to be performed prior to the processing on the LV belonging to group A.

A reason of setting that the on-cache LV belonging to group B has a higher priority than that of the off-cache LV belonging to group B as indicated in the records 1301-1 and 1301-2 will be described. In the second half part, the file system belonging to group B is unmounted. If the file system is unmounted, it is difficult for the LV belonging to group B to be read, and the virtual tape library system 200 needs to perform the recall process. Therefore, the hierarchical control server 201 processes the on-cache LV present in the RAID group of group B with the first priority.

A reason of setting that the on-cache LV belonging to group A has a lower priority than the off-cache LV belonging to group A as indicated in the records 1301-3 and 1301-4 will be described. In the first half part, since the file system belonging to group A is under firm application, the file system is unmounted. Accordingly, if the processing on the on-cache LV belonging to group A is performed in the first half part, the virtual tape library system 200 performs the recall process in despite of the "on cache". In contrast, in the second half part, since the file system is mounted, the virtual tape library system 200 does not need to perform the recall process when performing the processing on the on-cache LV belonging to group A. Accordingly, the hierarchical control server 201 processes the on-cache LV present in the RAID group of group A with the fourth priority, that is, the lowest priority.

FIG. 14 is a diagram illustrating an example of the LV processing priority in the second half part. A table 1400 indicates the LV processing priority in the second half part. The table 1400 includes records 1401-1 to 1401-4. The RAID group belonging to group A is a RAID group on which the firm application is first performed, and the RAID group belonging to group B is a RAID group on which I/O requested from the host device 211 is first performed. The priority in the table 1400 is assumed to be higher when having a smaller value. Processing on the LVs having the same priority is assumed to be performed in a time order of a request.

A reason of setting that the LV belonging to group A has a higher priority than that of the LV belonging to group B as indicated in the records 1401-1 to 1401-4 will be described. In the second half part, the hierarchical control server 201 performs the firm application on group B since hierarchical control server 201 has completed the firm application of group A. Accordingly, the hierarchical control server 201 causes the processing on the LV belonging to group A to be performed prior to the processing on the LV belonging to group B. The hierarchical control server 201 processes the on-cache LV present in the RAID group of group A with the first priority.

A reason of setting that the on-cache LV belonging to group B has a lower priority than the off-cache LV belonging to group B as indicated in the records 1401-3 and 1401-4 will be described. In the second half part, since the file system belonging to group B is under firm application, the file system is unmounted. Accordingly, if the processing on the on-cache LV belonging to group B is performed in the second half part, the virtual tape library system 200 performs the recall process in despite of the "on cache". In contrast, since the file system is mounted in the second half part after the firm application has been completed, the virtual tape library system 200 does not need to perform the recall process when performing the processing on the on-cache LV belonging to group B. Accordingly, the hierarchical control server 201 processes the on-cache LV present in the RAID group of group B with the fourth priority, that is, the lowest priority.

FIGS. 15A to 15C are diagrams illustrating an example of a method of grouping. In FIGS. 15A to 15C, a method of classification into group A and group B will be described. In an initial state, both group A and group B are empty. First, the hierarchical control server 201 extracts LVs that are subject to the append write process and the read process, the reorganization process, and the recall process.

Then, the hierarchical control server 201 calculates a total processing time (LVtm) of processing the on-cache LVs for each of RAID groups (LVrds) to which the extracted LVs belong. As a specific calculation method, the hierarchical control server 201, for example, may obtain the number of the on-cache LVs belonging to a certain LVrd, and set a time obtained by multiplying the obtained number by an average time taken for each processing, to obtain a total processing time (LVtm) of the certain LVrd. When the average time taken for each processing is greatly different between the append write process, the read process, and the like, the hierarchical control server 201 may prepare an average time taken for each type of processing. The hierarchical control server 201 may calculate a sum of times obtained by multiplying the number of the on-cache LVs of each type of processing by the average time taken for each type of processing, to obtain the total processing time (LVtm) of the certain LVrd. The table 1501 illustrated in FIG. 15A indicates an example of an on-cache LV processing time for each RAID group (LVrd).

Then, the hierarchical control server 201 sets LVtm for each LVrd to LVstm_1, . . . , LVstm_n, . . . , LVstm_N in descending order. N is the number of the RAID groups. In the example of table 1501 illustrated in FIG. 15A, the hierarchical control server 201 sets the on-cache LV processing time of RAID#DATA-3 indicated in the record 1501-3 to LVstm_1, as illustrated in FIG. 15B. Similarly, the hierarchical control server 201 sets the on-cache LV processing times of RAID#DATA-4, RAID#DATA-1, and RAID#DATA-2 to LVstm_2, LVstm_3, and LVstm_4, respectively.

The hierarchical control server 201 adds the on-cache LV processing times in descending order until the sum of the on-cache LV processing times exceeds the time Tfw taken for the firm application per disk, and classifies the RAID groups corresponding to the sum of the on-cache LV processing times into group B. Tfw may be a value determined in advance by an administrator of the virtual tape library system 200 or may be a time taken for the firm application in the past. When the types of disks are the same within the same RAID group, Tfw is the same as a firm application time of the entire RAID group.

When the sum of the on-cache LV processing times exceeds Tfw, the hierarchical control server 201 classifies the RAID groups, which are not classified into group B, into group A. In the example of FIGS. 15A to 15C, it is assumed that Tfw=15. In the example of FIG. 15B, the on-cache LV processing time of RAID#DATA-3 is 20 and exceeds Tfw=15. A result of grouping for the example of FIG. 15B by the hierarchical control server 201 is indicated in a table 1502 of FIG. 15C. As indicated in the record 1502-2 of the table 1502, the hierarchical control server 201 classifies the RAID group RAID#DATA-3 into group B. Further, as indicated in the record 1502-1 of Table 1502, the hierarchical control server 201 classifies the RAID groups RAID#DATA-1, RAID#DATA-2, and RAID#DATA-4 into group A.

Next, example of respective operations in the append write process, the read process, and the reorganization process in the first half part and the second half part will be described with reference to FIGS. 16A to 21B. A common premise in FIGS. 16A to 21B is that RAID#DATA-1 belongs to group A on which the firm application is first performed, and RAID#DATA-2 belongs to group B on which I/O is first performed.

Figures 16A, 16B:
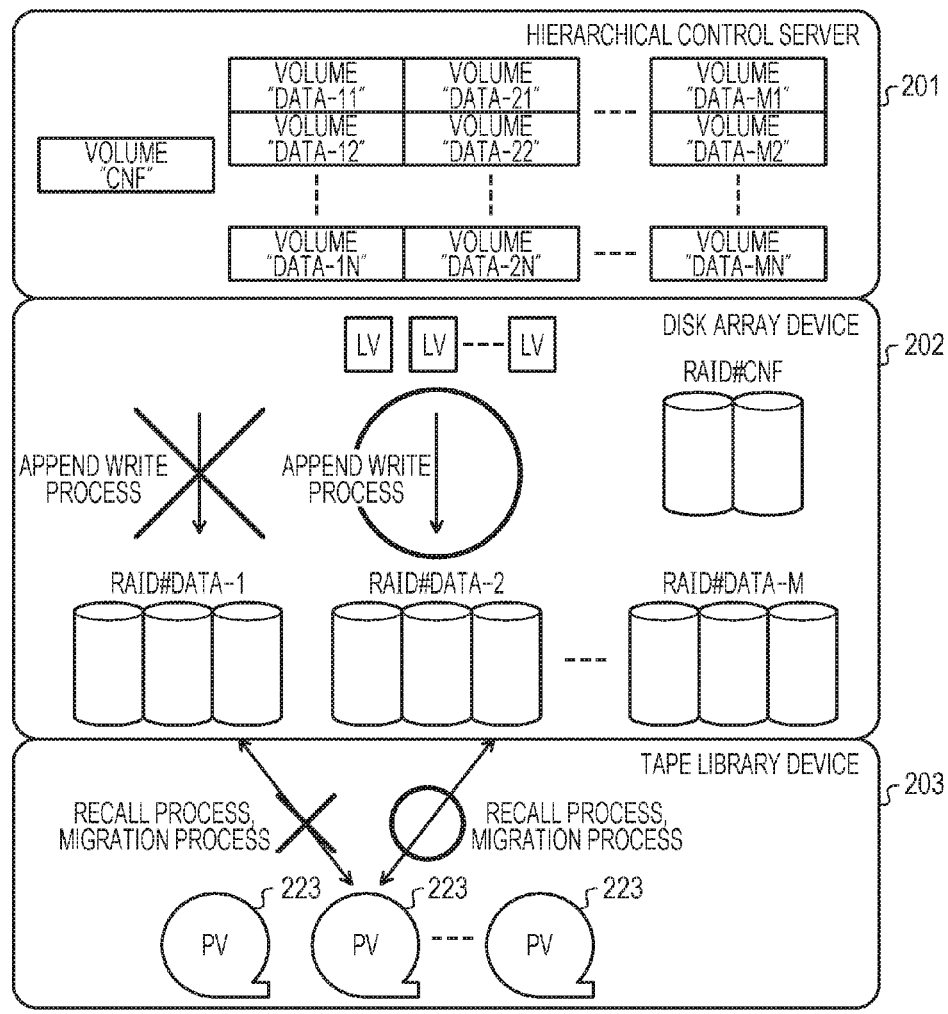
FIGS. 16A and 16B are diagrams illustrating an example of an operation in an append write process in a first half part.

FIGS. 16A and 16B are diagrams illustrating an example of an operation in the append write process in the first half part. FIG. 16A illustrates an example of an operation in the append write process in the first half part. As illustrated in FIG. 16A, the virtual tape library system 200 performs the append write process, the recall process, and the migration process on RAID#DATA-2, and does not perform the append write process, the recall process, and the migration process on RAID#DATA-1.

FIG. 16B illustrates a table 1600 in which availability of the processes in the first half part is summarized. In the first half part, the virtual tape library system 200 does not perform the append write process to RAID#DATA-1, the recall process from the PV 223 to RAID#DATA-1, and the migration process from RAID#DATA-1 to the PV 223. On the other hand, in the first half part, the virtual tape library system 200 performs the append write process to RAID#DATA-2, the recall process from the PV 223 to RAID#DATA-2, and the migration process from RAID#DATA-2 to the PV 223. Accordingly, the virtual tape library system 200 performs, via RAID#DATA-2, the processes relating to an LV of RAID#DATA-1 which is under firm application.

Figures 17A, 17B:
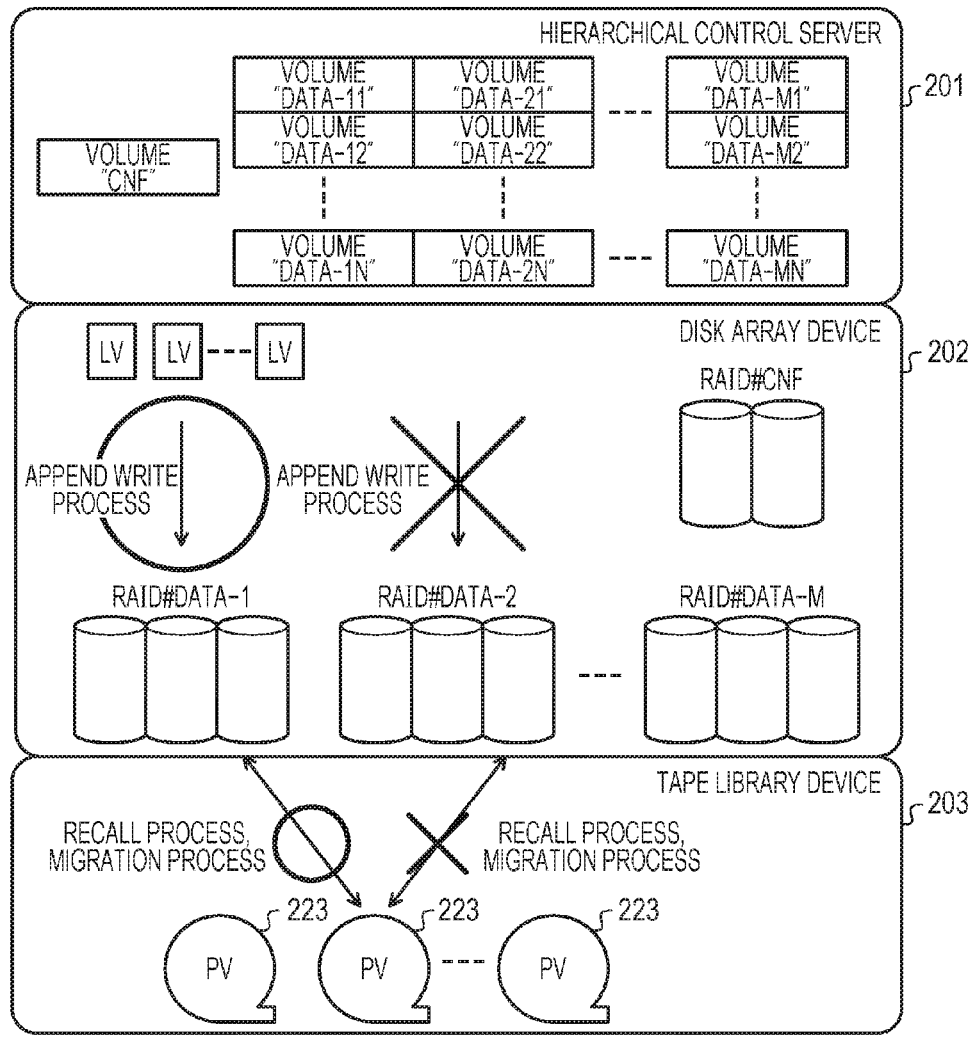
FIGS. 17A and 17B are diagrams illustrating an example of an operation in an append write process in a second half part.

FIGS. 17A and 17B are diagrams illustrating an example of an operation in the append write process in the second half part. FIG. 17A illustrates an example of an operation in the append write process in the second half part. As illustrated in FIG. 17A, the virtual tape library system 200 performs the append write process, the recall process, and the migration process on RAID#DATA-1, and does not perform the append write process, the recall process, and the migration process on RAID#DATA-2.

FIG. 17B illustrates a table 1700 in which availability of the processes in the second half part is summarized. In the second half part, the virtual tape library system 200 does not perform the append write process to RAID#DATA-2, the recall process from the PV 223 to RAID#DATA-2, and the migration process from RAID#DATA-2 to the PV 223. On the other hand, in the second half part, the virtual tape library system 200 performs the append write process to RAID#DATA-1, the recall process from the PV 223 to RAID#DATA-1, and the migration process from RAID#DATA-1 to the PV 223. Accordingly, the virtual tape library system 200 performs, via RAID#DATA-1, the processes relating to an LV of RAID#DATA-2 which is under firm application.

FIGS. 18A and 18B are diagrams illustrating an example of an operation in the read process in the first half part. FIG. 18A illustrates an example of an operation in the read process in the first half part. As illustrated in FIG. 18A, the virtual tape library system 200 performs the read process and the recall process on RAID#DATA-2, and does not perform the read process and the recall process on RAID#DATA-1.

FIG. 18B illustrates a table 1800 in which availability of the processes in the first half part is summarized. In the first half part, the virtual tape library system 200 does not perform the read process from RAID#DATA-1 to the host device 211 and the recall process from the PV 223 to RAID#DATA-1. On the other hand, in the first half part, the virtual tape library system 200 performs the read process from RAID#DATA-2 to the host device 211 and the recall process from the PV 223 to RAID#DATA-2. Accordingly, the virtual tape library system 200 performs, via RAID#DATA-2, the processes relating to an LV of RAID#DATA-1 which is under firm application.

FIGS. 19A and 19B are diagrams illustrating an example of an operation in the read process in the second half part. FIG. 19A illustrates an example of an operation in the read process in the second half part. As illustrated in FIG. 19A, the virtual tape library system 200 performs the read process and the recall process on RAID#DATA-1, and does not perform the read process and the recall process on RAID#DATA-2.

FIG. 19B illustrates a table 1900 in which availability of the processes in the second half part is summarized. In the second half part, the virtual tape library system 200 does not perform the read process from RAID#DATA-2 to the host device 211 and the recall process from the PV 223 to RAID#DATA-2. On the other hand, in the second half part, the virtual tape library system 200 performs the read process from RAID#DATA-1 to the host device 211 and the recall process from the PV 223 to RAID#DATA-1. Accordingly, the virtual tape library system 200 performs, via RAID#DATA-1, the processes relating to an LV of RAID#DATA-2 which is under firm application.

FIGS. 20A and 20B are diagrams illustrating an example of an operation in the reorganization process in the first half part. FIG. 20A illustrates an example of an operation in the reorganization process in the first half part. As described with reference to FIG. 5, the reorganization process is a combination of the recall process and the migration process. As illustrated in FIG. 20A, the virtual tape library system 200 performs the recall process and the migration process on RAID#DATA-2, and does not perform the recall process and the migration process on RAID#DATA-1.

FIG. 20B illustrates a table 2000 in which availability of the processes in the first half part is summarized. In the first half part, the virtual tape library system 200 does not perform the recall process from the PV 223 to RAID#DATA-1 and the migration process from RAID#DATA-1 to the PV 223. On the other hand, in the first half part, the virtual tape library system 200 performs the recall process from the PV 223 to RAID#DATA-2 and the migration process from RAID#DATA-2 to the PV 223. Accordingly, the virtual tape library system 200 performs, via RAID#DATA-2, the processes relating to an LV of RAID#DATA-1 which is under firm application.

FIGS. 21A and 21B are diagrams illustrating an example of an operation in the reorganization process in the second half part. FIG. 21A illustrates an example of an operation in the reorganization process in the second half part. As illustrated in FIG. 21A, the virtual tape library system 200 performs the recall process and the migration process on RAID#DATA-1, and does not perform the recall process and the migration process on RAID#DATA-2.

FIG. 21B illustrates a table 2100 in which availability of the processes in the second half part is summarized. In the second half part, the virtual tape library system 200 does not perform the recall process from the PV 223 to RAID#DATA-2 and the migration process from RAID#DATA-2 to the PV 223. On the other hand, in the second half part, the virtual tape library system 200 performs the recall process from the PV 223 to RAID#DATA-1 and the migration process from RAID#DATA-1 to the PV 223. Accordingly, the virtual tape library system 200 performs, via RAID#DATA-1, the processes relating to an LV of RAID#DATA-2 which is under firm application.

Next, examples of updating the LV information table 401 for the LVs with priorities "1" to "4" will be described with reference to FIGS. 22A to 25E. In FIGS. 22A to 25E, it is assumed that LVs having LV names APWR01 to APWR04 are subject to the append write process. It is assumed that LVs having LV names READ01 to READ04 are subject to the read process. Further, it is assumed that LVs having LV names REOG01 to REOG04 are subject to the reorganization process. In FIGS. 22A to 25E, hatched items are updated items.

FIGS. 22A to 22D are diagrams illustrating an example of updating stored contents of the LV information table 401 in response to the processes on the LVs with priority "1". The LV information table 401 illustrated in FIGS. 22A to 22D holds records 2201-1 to 2201-3. The LVs indicated in the records 2201-1 to 2201-3 correspond to the record 1301-1 of the table 1300 or the record 1401-1 of the table 1400 and all have priority "1". Since the LV has priority "1", the file system DATA-21 is mounted, and I/O is available. The LV information table 401 illustrated in FIG. 22A illustrates a state before the processes on the LVs indicated in the records 2201-1 to 2201-3 are performed. Since the LVs have priority "1", all of the states of the LVs are "on cache".

FIG. 22B illustrates a state of a first stage of the processes on the LVs indicated in the records 2201-1 to 2201-3. As indicated in the record 2201-1 in FIG. 22B, for an LV APWR01, the LV capacity becomes 750000 [Byte] due to the append write process, and the hierarchical control server 201 updates the state from "on cache" to "under append write process".

As indicated by a record 2201-2 in FIG. 22B, for an LV READ01, the hierarchical control server 201 updates the state from "on cache" to "under read process" due to the read process.

As indicated in the record 2201-3 in FIG. 22B, for an LV REOG01, the hierarchical control server 201 updates the PV name from "TVXQ00" to "TVXQ01" through the reorganization process. Further, as indicated by a record 2201-3 in FIG. 22B, for the LV REOG01, the hierarchical control server 201 updates the state from "on cache" to "under reorganization process".

FIG. 22C illustrates a state of a second stage of the processes on the LVs indicated in the records 2201-1 to 2201-3. As indicated in the record 2201-1 in FIG. 22C, for the LV APWR01, the LV capacity becomes 1000000 [Byte] through the append write process. As indicated in the record 2201-1 in FIG. 22C, for the LV APWR01, the hierarchical control server 201 updates the state from "under append write process" to "under migration process" through the migration process after the append write process. As indicated in the records 2201-2 and 2201-3 in FIG. 22C, for the LV READ01 and the LV REOG01, the hierarchical control server 201 updates the state to "on cache" since each process is completed.

FIG. 22D illustrates a state in which all of the processes on the LVs indicated in the records 2201-1 to 2201-3 have been completed. As indicated in the record 2201-1 in FIG. 22D, for the LV APWR01, the hierarchical control server 201 updates the state to "on cache" since the migration process has been completed.

FIGS. 23A to 23E are diagrams illustrating an example of updating stored contents of the LV information table 401 in response to the processes on the LVs with priority "2". The LV information table 401 illustrated in FIGS. 23A to 23E holds records 2301-1 to 2301-3. The LVs indicated in the records 2301-1 to 2301-3 correspond to the record 1301-2 of the table 1300 or the record 1401-2 of the table 1400 and all have priority "2". Since the LV has priority "2", the file system DATA-21 is mounted, and I/O is available. The LV information table 401 illustrated in FIG. 23A illustrates a state before the processes on the LVs indicated in the records 2301-1 to 2301-3 are performed. Since the LVs have priority "2", all of the states of the LVs are "off cache".

FIG. 23B illustrates a state of a first stage of the processes on the LVs indicated in the records 2301-1 to 2301-3. As indicated in the records 2301-1 to 2301-3 in FIG. 23B, for all the LVs, the hierarchical control server 201 updates a state from "off cache" to "under recall process" through the recall process.

After the recall process is performed, the hierarchical control server 201 performs similar processes as the processes on the LVs with priority "1" since the states of the LVs are "on cache". Accordingly, FIGS. 23C to 23E are similar to FIGS. 22B to 22D, therefore description thereof will be omitted.

FIGS. 24A to 24E are diagrams illustrating an example of updating stored contents of the LV information table 401 in response to the processes on the LVs with priority "3". The LV information table 401 illustrated in FIGS. 24A to 24E holds records 2401-1 to 2401-3. The LVs indicated in the records 2401-1 to 2401-3 correspond to the record 1301-3 of the table 1300 or the record 1401-3 of the table 1400 and all have priority "3". Since the LV has priority "3", the file system DATA-11 is unmounted, and I/O is unavailable. The LV information table 401 illustrated in FIG. 24A illustrates a state before the processes on the LVs indicated in the records 2401-1 to 2401-3 are performed. Since the LVs have priority "3", all of the states of the LVs are "off cache".

FIG. 24B illustrates a state of a first stage of the processes on the LVs indicated in the records 2401-1 to 2401-3. As indicated in the records 2401-1 to 2401-3 in FIG. 24B, the hierarchical control server 201 changes the file system, to which all the LVs belong, from the unmounted file system DATA-11 to a mounted file system DATA-21. As indicated by records 2401-1 to 2401-3 of FIG. 24B, since there is no data corresponding to the PV in the file system DATA-21, the hierarchical control server 201 updates the state to "under recall process" through the recall process.

After the recall process is performed, the hierarchical control server 201 performs similar processes as the processes on the LVs with priority "1" or priority "2" since the file system, to which the LVs belong, is mounted and the state of the LVs are "on cache". Accordingly, FIGS. 24C to 24E are similar to FIGS. 22B to 22D, therefore description thereof will be omitted.

FIGS. 25A to 25E are diagrams illustrating an example of updating stored contents of the LV information table 401 in response to the processes on the LVs with priority "4". The LV information table 401 illustrated in FIGS. 25A to 25E holds records 2501-1 to 2501-3. The LVs indicated in the records 2501-1 to 2501-3 correspond to the record 1301-4 of the table 1300 or the record 1401-4 of the table 1400 and all have priority "4". Since the LV has priority "4", the file system DATA-21 is unmounted, and I/O is unavailable. The LV information table 401 illustrated in FIG. 25A illustrates a state before the processes on the LVs indicated in the records 2501-1 to 2501-3 are performed. Since the LVs have priority "4", all of the states of the LV are "on cache".

FIG. 25B illustrates a state of a first stage of the processes on the LVs indicated in the records 2501-1 to 2501-3. Even when the state is "on cache", it is difficult for the hierarchical control server 201 to access the unmounted file system. As indicated in the records 2501-1 to 2501-3 of FIG. 25B, the hierarchical control server 201 changes the file system, to which all the LVs belong, from the unmounted file system DATA-21 to a mounted file system DATA-11. As indicated by records 2501-1 to 2501-3 of FIG. 25B, since there is no data corresponding to the PV in the file system DATA-11, the hierarchical control server 201 updates the state to "under recall process" through the recall process.

After the recall process is performed, the hierarchical control server 201 performs similar processes as the processing on the LVs with priorities "1" to "3" since the file system, to which the LVs belong, is mounted and the state of the LVs are "on cache". Accordingly, FIGS. 25C to 25E are similar to FIGS. 22B to 22D, therefore description thereof will be omitted.

Next, an example in which stored contents of the file system information table 404 and the disk information table 402 is updated before and after the firm application will be described with reference to FIGS. 26A to 27C. In FIGS. 26A to 27C, hatched items are updated items.

FIGS. 26A to 26E are diagrams illustrating an example of updating stored contents of the file system information table 404 before and after the firm application. The file system information table 404 illustrated in FIGS. 26A to 26E holds records 2601-1 to 2601-5. In FIGS. 26A to 26E, RAID#DATA-1 belongs to group A which includes RAID groups on which the firm application is first performed, and RAID#DATA-2 belongs to group B which includes RAID groups on which I/O is first performed. The file system information table 404 illustrated in FIG. 26A indicates a state before the firm application.

FIG. 26B illustrates a state during the first half part. As indicated in the records 2601-2 and 2601-3 in FIG. 26B, the hierarchical control server 201 unmounts file systems DATA-11 and DATA-12 of RAID#DATA-1 belonging to group A. FIG. 26C illustrates a state at a time point at which the first half part ends. As indicated in the records 2601-2 and 2601-3 in FIG. 26C, the hierarchical control server 201 mounts the file systems DATA-11 and DATA-12 of RAID#DATA-1 belonging to group A.

FIG. 26D illustrates a state during the second half part. As indicated in the records 2601-4 and 2601-5 in FIG. 26D, the hierarchical control server 201 unmounts file systems DATA-21 and DATA-22 of RAID#DATA-2 belonging to group B. FIG. 26E illustrates a state at a time point at which the second half part ends. As indicated in the records 2601-4 and 2601-5 in FIG. 26E, the hierarchical control server 201 mounts the file systems DATA-21 and DATA-22 of RAID#DATA-2 belonging to group B.

FIGS. 27A to 27C are diagrams illustrating an example of updating stored contents of the disk information table 402 before and after the firm application. The disk information table 402 illustrated in FIGS. 27A to 27C holds records 2701-1 to 2701-7. In FIGS. 27A to 27C, it is assumed that the firm application is performed on Disk#02 to Disk#06. It is assumed that firm with a firm version number FA99 is applied. Further, it is assumed that RAID#DATA-1 belongs to group A which includes RAID groups on which the firm application is first performed, and RAID#DATA-2 belongs to group B which includes RAID groups on which I/O is first performed. The disk information table 402 illustrated in FIG. 27A indicates a state prior to the firm application.

FIG. 27B illustrates a state at a time point at which the first half part ends. As indicated by the records 2701-3 and 2701-4 in FIG. 27B, the hierarchical control server 201 completes the firm application of Disk#02 and Disk#03. FIG. 27C illustrates a state at a time point at which the second half part ends. As indicated by the records 2701-5 to 2701-7 in FIG. 27C, the hierarchical control server 201 completes the firm application of Disk#04 to Disk#06.

Next, a process performed by the hierarchical control server 201 will be described with reference to FIGS. 28 to 40.

Figure 28:
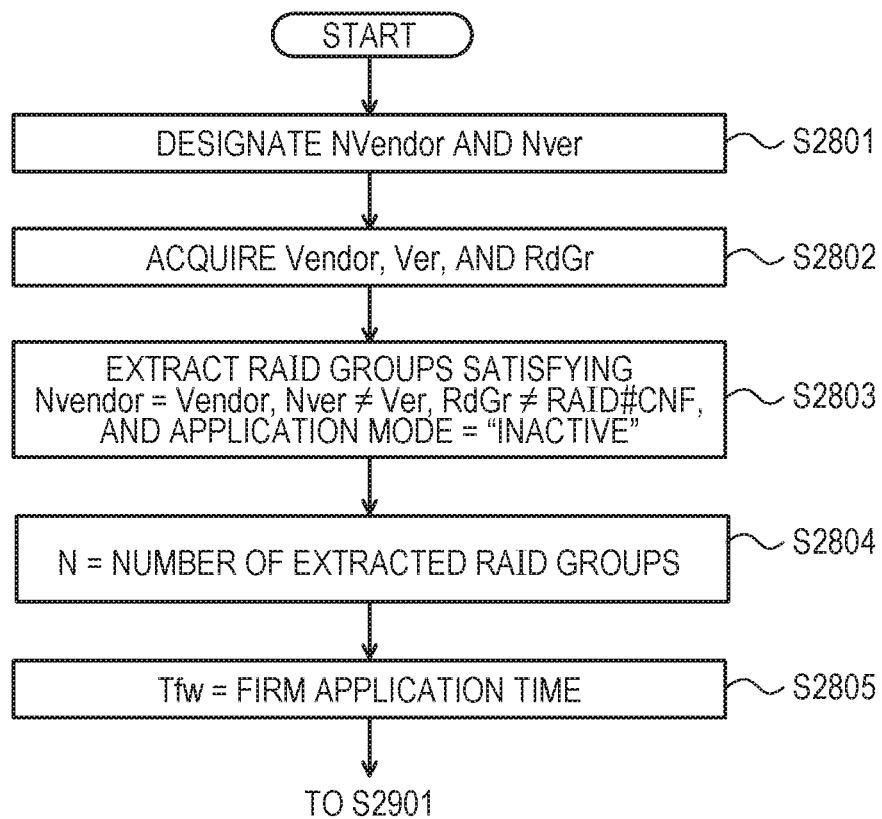
FIG. 28 is a flowchart illustrating an example of a RAID group classification process.
Figure 29:
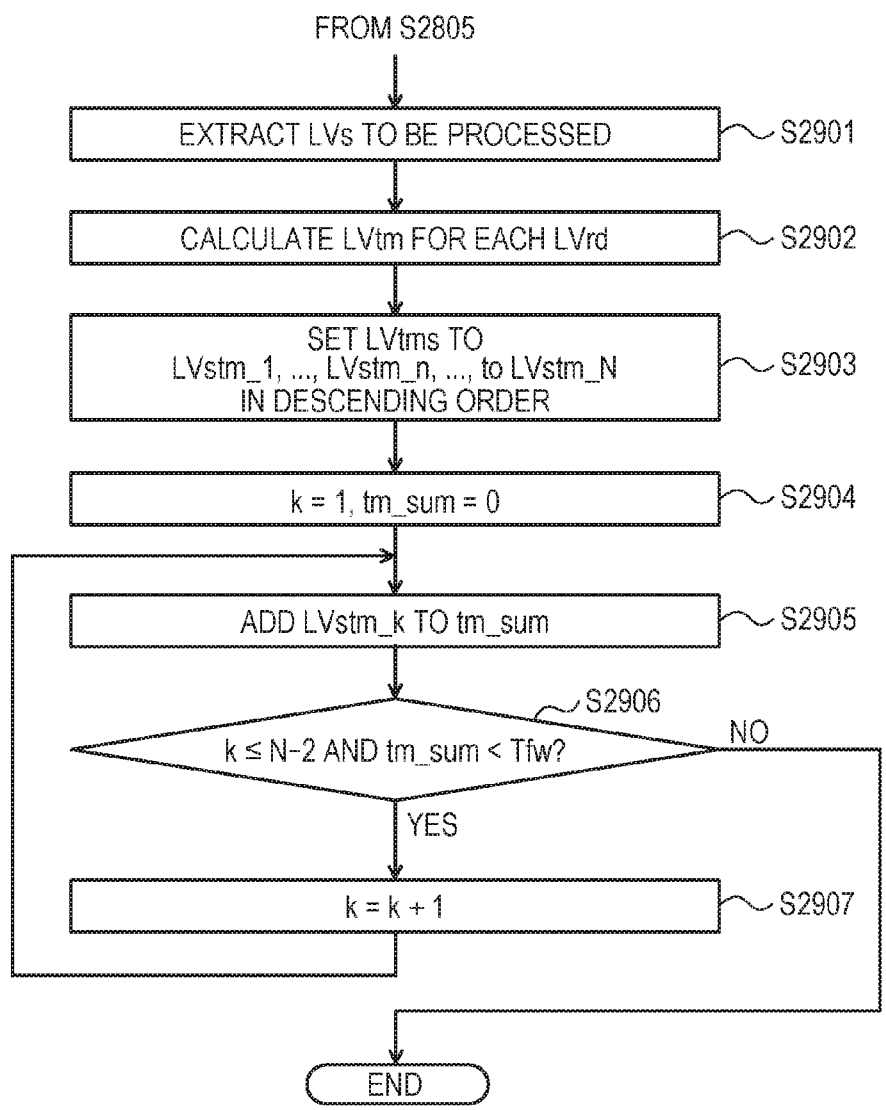
FIG. 29 is a flowchart illustrating an example of a RAID group classification process.

FIGS. 28 and 29 are flowcharts illustrating an example of a RAID group classification process. The RAID group classification process is a process of classifying a plurality of RAID groups into group A on which the firm application is first performed, and group B on which I/O requested from the host device 211 is first performed.

The hierarchical control server 201 designates an applicable vendor (NVendor) and an application version number (Nver) for the firm to be applied to the disk (S2801). Then, the hierarchical control server 201 acquires a vendor name (Vendor), a firm version number (Ver), and a RAID group name (RdGr) of each disk on which the firm application is to be performed (S2802). The hierarchical control server 201 extracts the RAID groups of the user area that satisfy all of the following conditions: Nvendor=Vendor, Nver # Ver, and RdGr # RAID#CNF, application mode="inactive" (S2803). Here, the application mode indicates a mode of a command that the hierarchical control server 201 issues to the disk array device 202. The mode "inactive" indicates that the file system is unmounted, the I/O is stopped, and the firm application is performed. On the other hand, a mode "active" indicates that the firm application is performed without stopping I/O while the file system is being mounted.

Then, the hierarchical control server 201 sets the number of the extracted RAID groups on which the firm application is to be performed to N (S2804). The hierarchical control server 201 sets a time taken for the firm application per disk to Tfw (S2805).

Then, the hierarchical control server 201 extracts the LVs that are subject to the append write process, the read process, the reorganization process, or the recall process (S2901). The hierarchical control server 201 calculates a total processing time (LVtm) of on-cache LVs for each RAID group (LVrd), with respect to all of the extracted LVs (S2902). Then, the hierarchical control server 201 sets LVtm for each LVrd to LVstm_1, . . . , LVstm_n, . . . , LVstm_N in a descending order (S2903). The hierarchical control server 201 sets 1 to k and sets 0 to tm_sum (S2904).

Then, the hierarchical control server 201 adds LVstm_k to tm_sum (S2905). The hierarchical control server 201 determines whether k is smaller than or equal to N−2 and tm_sum is smaller than Tfw (S2906). When k is smaller than or equal to N−2 and tm_sum is smaller than Tfw (S2906: Yes), the hierarchical control server 201 adds 1 to k (S2907). The hierarchical control server 201 proceeds to S2905.

On the other hand, if the k is greater than N−2 or tm_sum is equal to or greater than Tfw (S2906: No), the hierarchical control server 201 ends the RAID group classification process. When S2906 is No, the hierarchical control server 201 classifies the first to k-th RAID groups into group B, and classifies the (k+1)-th to N-th RAID groups into group A. By performing the RAID group classification process, the hierarchical control server 201 may classify a plurality of RAID groups into group A and group B.

Figure 30:
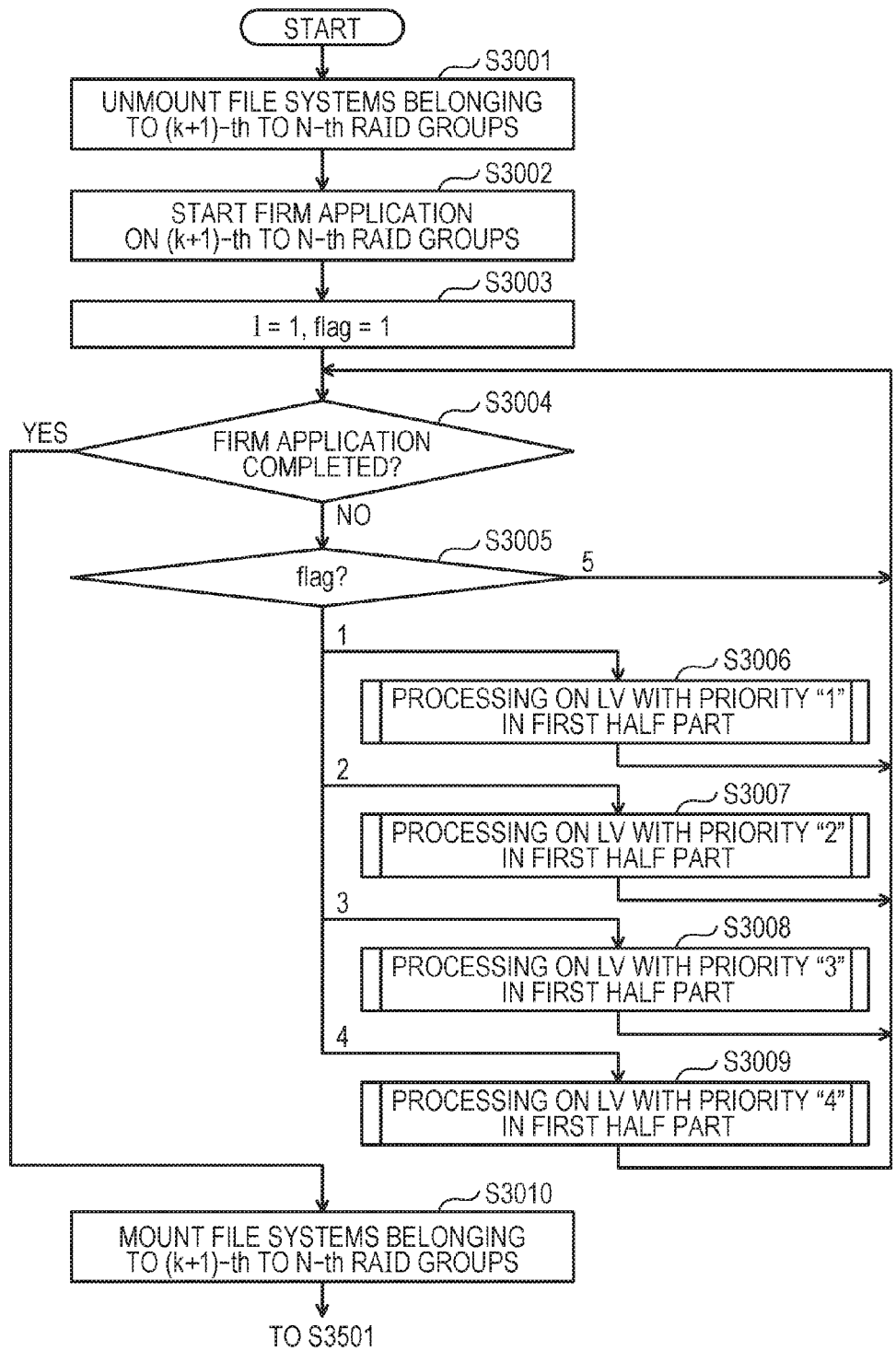
FIG. 30 is a flowchart illustrating an example of a firm application process.

FIG. 30 is a flowchart illustrating an example of a firm application process. The firm application process is a process of applying a firm to a RAID group. The firm application process is performed after the RAID group classification process illustrated in FIGS. 28 and 29.

The hierarchical control server 201 unmounts all of the file systems belonging to the (k+1)-th to N-th RAID groups as group A (S3001). Then, the hierarchical control server 201 starts the firm application on the (k+1)-th to N-th RAID groups (S3002). The hierarchical control server 201 sets 1 to l and sets 1 to a flag (S3003).

Then, the hierarchical control server 201 determines whether the firm application on the (k+1)-th to N-th RAID groups has been completed (S3004). When the firm application on the (k+1)-th to N-th RAID groups has not been completed (S3004: No), the hierarchical control server 201 checks the value of the flag (S3005).

When the value of the flag is 1 (S3005: 1), the hierarchical control server 201 performs the processing on an LV with priority "1" in the first half part (S3006). The processing on an LV with priority "1" in the first half part will be described with reference to FIG. 31. When the value of the flag is 2 (S3005: 2), the hierarchical control server 201 performs the processing on an LV with priority "2" in the first half part (S3007). The processing on an LV with priority "2" in the first half part will be described with reference to FIG. 32.

When the value of the flag is 3 (S3005: 3), the hierarchical control server 201 performs the processing on an LV with priority "3" in the first half part (S3008). The processing on an LV with priority "3" in the first half part will be described with reference to FIG. 33. When the value of the flag is 4 (S3005: 4), the hierarchical control server 201 performs the processing on an LV with priority "4" in the first half part (S3009). The processing on an LV with priority "4" in the first half part will be described with reference to FIG. 34.

After any one of S3006 to S3009 ends or when the value of the flag is 5 (S3005: 5), the hierarchical control server 201 proceeds to S3004.

When the firm application on the (k+1)-th to N-th RAID groups has been completed (S3004: Yes), the hierarchical control server 201 mounts all of the file systems belonging to the (k+1)-th to N-th RAID groups (S3010). A process after S3010 will be described later with reference to FIG. 35.

Figure 31:
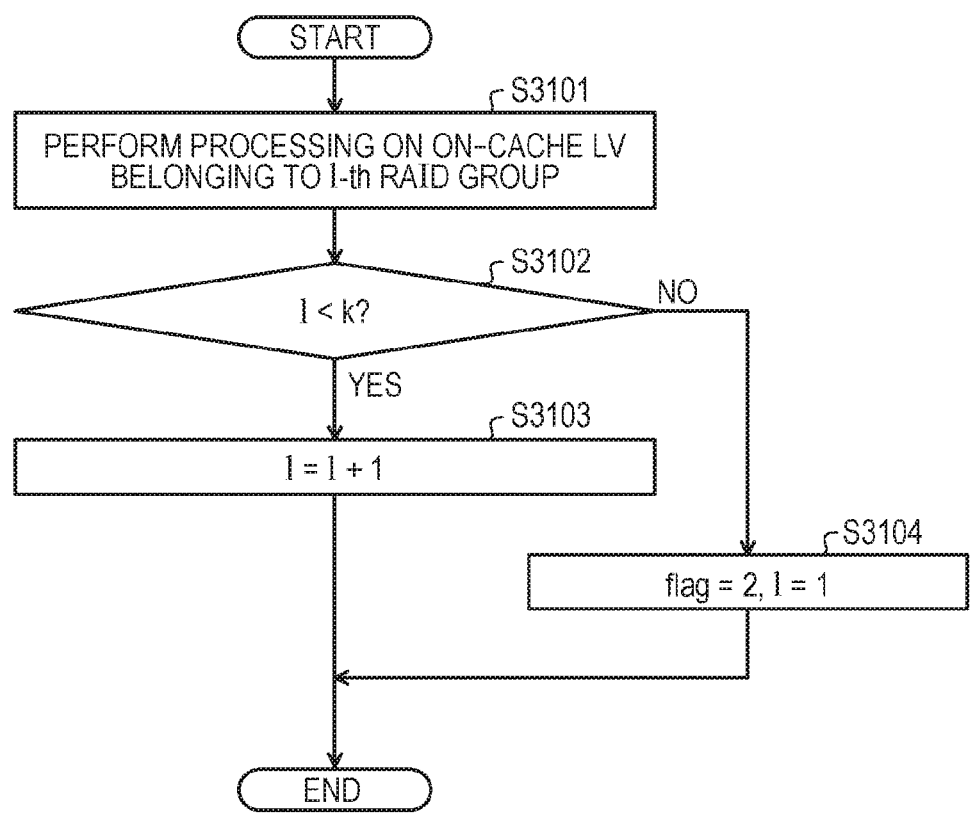
FIG. 31 is a flowchart illustrating an example of processing on an LV with priority "1" in a first half part.

FIG. 31 is a flowchart illustrating an example of the processing on an LV with priority "1" in the first half part. The hierarchical control server 201 performs the processing on the on-cache LV belonging to the l-th RAID group (S3101). Then, the hierarchical control server 201 determines whether l is smaller than k (S3102). When l is smaller than k (S3102: Yes), the hierarchical control server 201 adds 1 to l (S3103). When l is greater than or equal to k (S3102: No), the hierarchical control server 201 sets 2 to the flag, and sets 1 to l (S3104).

After S3103 or S3104 ends, the hierarchical control server 201 ends the processing on an LV with priority "1" in the first half part. By performing the processing on an LV with priority "1" in the first half part, the hierarchical control server 201 may perform the processing on the on-cache LVs belonging to group B, that is, belonging to the first to k-th RAID groups.

Figure 32:
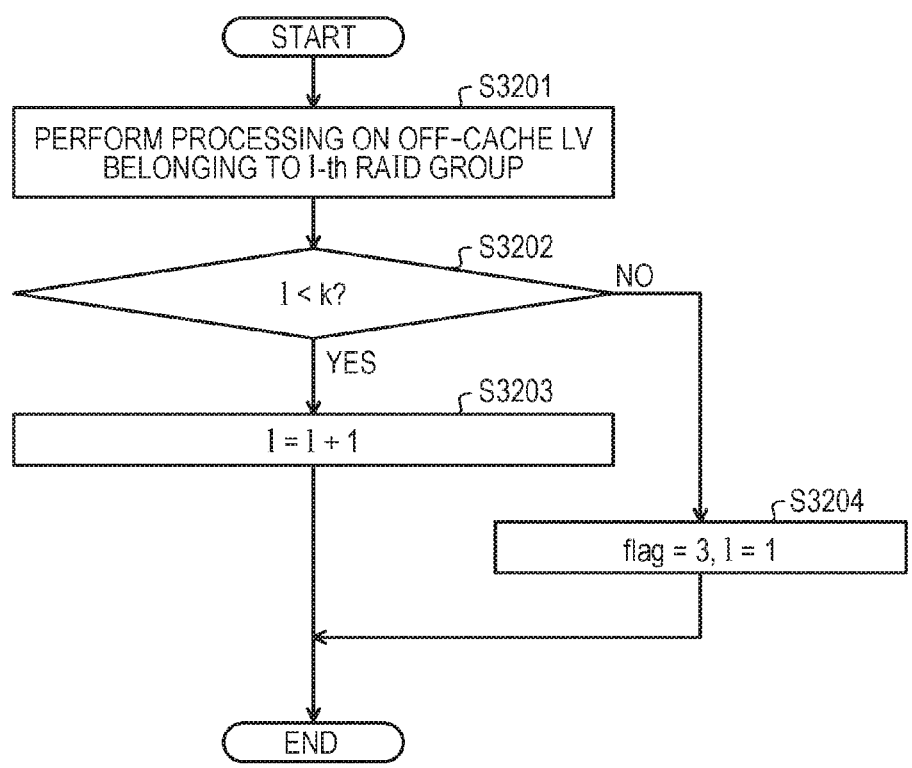
FIG. 32 is a flowchart illustrating an example of processing on an LV with priority "2" in a first half part.

FIG. 32 is a flowchart illustrating an example of the processing on an LV with priority "2" in the first half part. The hierarchical control server 201 performs the processing on the off-cache LV belonging to the l-th RAID group (S3201). Then, the hierarchical control server 201 determines whether l is smaller than k (S3202). When l is smaller than k (S3202: Yes), the hierarchical control server 201 adds 1 to l (S3203). When l is greater than or equal to k (S3202: No), the hierarchical control server 201 sets 3 to the flag, and sets 1 to l (S3204).

After S3203 or S3204 ends, the hierarchical control server 201 ends the processing on an LV with priority "2" in the first half part. By performing the processing on an LV with priority "2" in the first half part, the hierarchical control server 201 may perform the processing on the off-cache LVs belonging to group B, that is, belonging to the first to k-th RAID groups.

Figure 33:
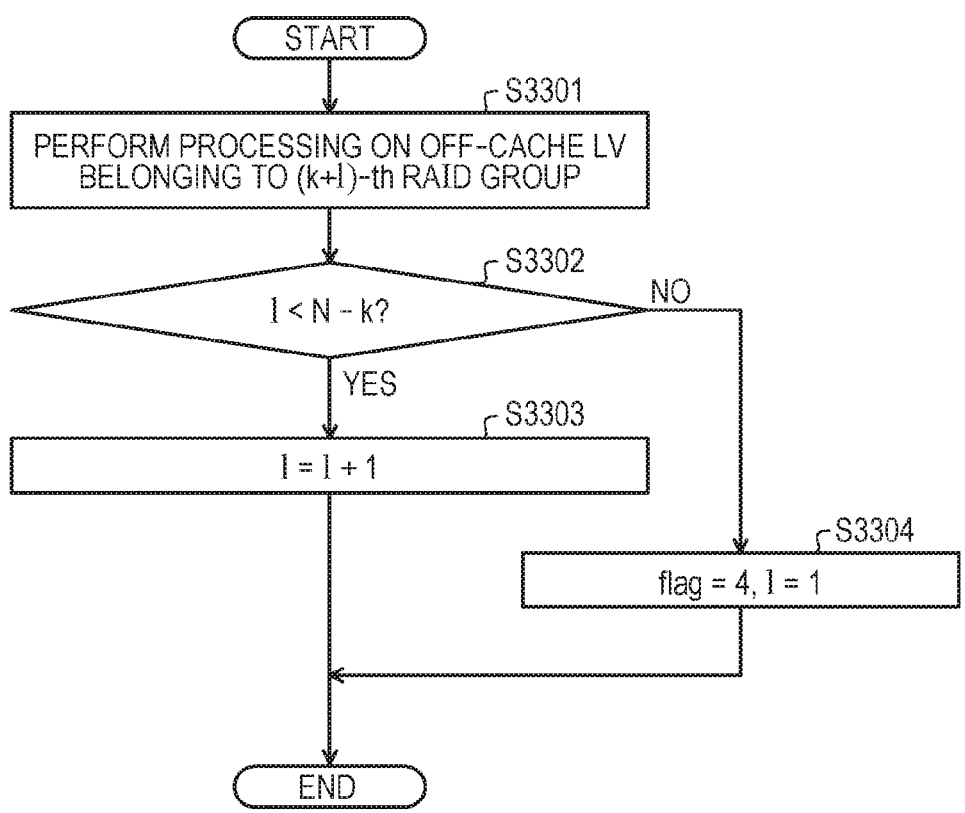
FIG. 33 is a flowchart illustrating an example of processing on an LV with priority "3" in a first half part.

FIG. 33 is a flowchart illustrating an example of the processing on an LV with priority "3" in the first half part. The hierarchical control server 201 performs the processing on the off-cache LV belonging to the (k+l)-th RAID group (S3301). In S3301, the hierarchical control server 201 sets, as a recall destination of the recall process, any one of RAID groups that are not under firm application.

Then, the hierarchical control server 201 determines whether l is smaller than N−k (S3302). When l is smaller than N−k (S3302: Yes), the hierarchical control server 201 adds 1 to l (S3303). When l is greater than or equal to N−k (S3302: No), the hierarchical control server 201 sets 4 to the flag, and sets 1 to l (S3304).

After S3303 or S3304 ends, the hierarchical control server 201 ends the processing on an LV with priority "3" in the first half part. By performing the processing on an LV with priority "3" in the first half part, the hierarchical control server 201 may perform the processing on the off-cache LVs belonging to group A, that is, belonging to the (k+1)-th to N-th RAID groups.

Figure 34:
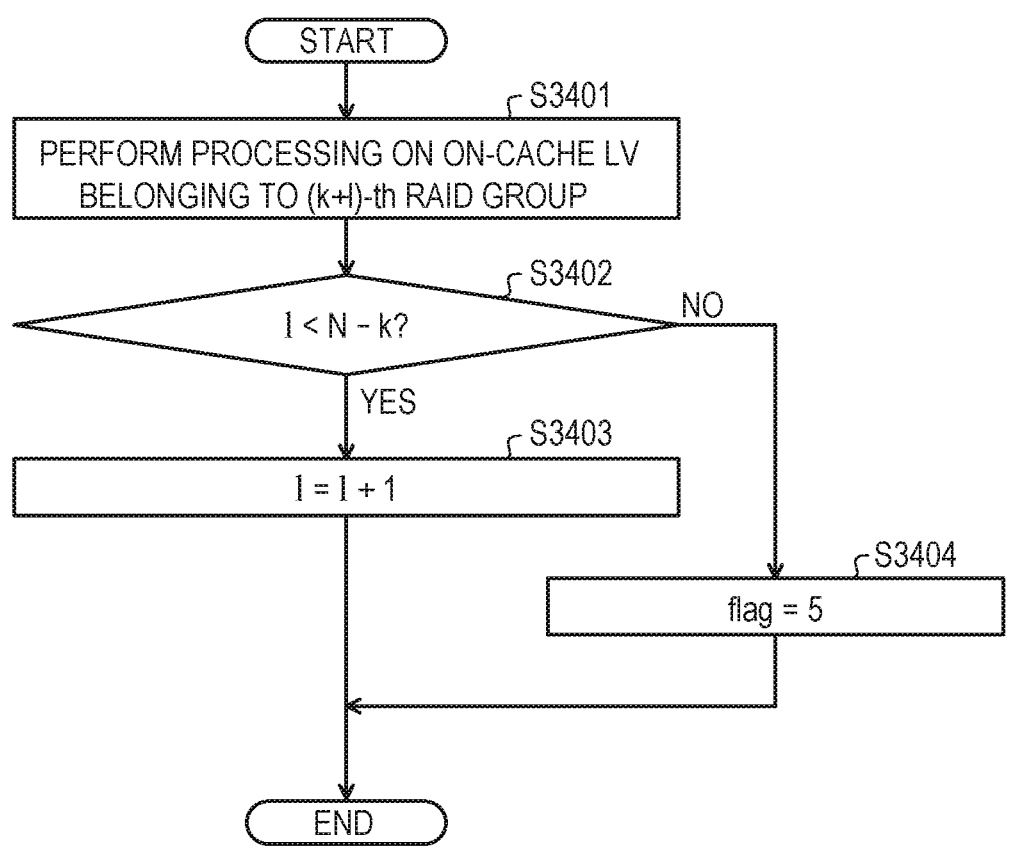
FIG. 34 is a flowchart illustrating an example of processing on an LV with priority "4" in a first half part.

FIG. 34 is a flowchart illustrating an example of the processing on an LV with priority "4" in the first half part. The hierarchical control server 201 performs the processing on the on-cache LV belonging to the (k+1)-th RAID group (S3401). In S3401, the hierarchical control server 201 sets, as a recall destination of the recall process, any one of RAID groups that are not under firm application.

Then, the hierarchical control server 201 determines whether l is smaller than N−k (S3402). When l is smaller than N−k (S3402: Yes), the hierarchical control server 201 adds 1 to l (S3403). When l is greater than or equal to N−k (S3402: No), the hierarchical control server 201 sets 5 to the flag (S3404).

After S3403 or S3404 ends, the hierarchical control server 201 ends the processing on an LV with priority "4" in the first half part. By performing the processing on an LV with priority "4" in the first half part, the hierarchical control server 201 may perform the processing on the on-cache LVs belonging to group A, that is, belonging to the (k+1)-th to N-th RAID groups.

Figure 35:
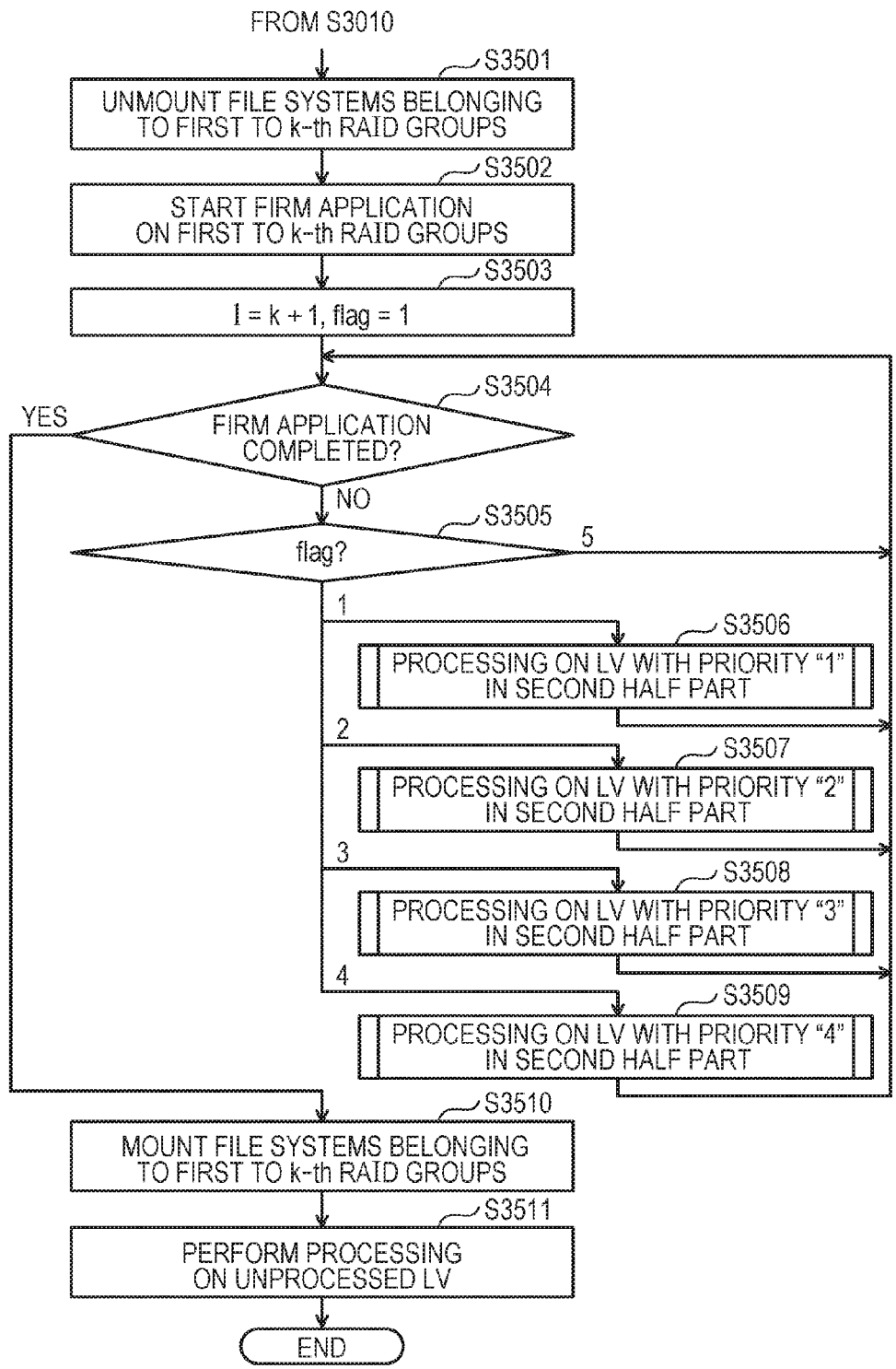
FIG. 35 is a flowchart illustrating an example of a firm application process.

FIG. 35 is a flowchart illustrating an example of the firm application process. The hierarchical control server 201 unmounts all of the file systems belonging to the first to k-th RAID groups as group B (S3501). Then, the hierarchical control server 201 starts the firm application on the first to k-th RAID groups (S3502). The hierarchical control server 201 sets k+1 to l, and sets 1 to the flag (S3503).

Then, the hierarchical control server 201 determines whether the firm application on the first to k-th RAID groups has been completed (S3504). When the firm application on the first to k-th RAID groups has not been completed (S3504: No), the hierarchical control server 201 checks the value of the flag (S3505).

When the value of the flag is 1 (S3505: 1), the hierarchical control server 201 performs the processing on an LV with priority "1" in the second half part (S3506). The processing on an LV with priority "1" in the second half part will be described with reference to FIG. 36. When the value of the flag is 2 (S3505: 2), the hierarchical control server 201 performs the processing on an LV with priority "2" in the second half part (S3507). The processing on an LV with priority "2" in the second half part will be described with reference to FIG. 37.

When the value of the flag is 3 (S3505: 3), the hierarchical control server 201 performs the processing on an LV with priority "3" in the second half part (S3508). The processing on an LV with priority "3" in the second half part will be described with reference to FIG. 38. When the value of the flag is 4 (S3505: 4), the hierarchical control server 201 performs the processing on an LV with priority "4" in the second half part (S3509). The processing on an LV with priority "4" in the second half part will be described with reference to FIG. 39.

After any one of S3506 to S3509 ends or when the value of the flag is 5 (S3505: 5), the hierarchical control server 201 proceeds to S3504.

When the firm application on the first to k-th RAID groups has been completed (S3504: Yes), the hierarchical control server 201 mounts all of the file systems belonging to the first to k-th RAID groups (S3510). Then, the hierarchical control server 201 performs the processing on unprocessed LVs (S3511). After S3511 ends, the hierarchical control server 201 ends the firm application process. By performing the firm application process, the hierarchical control server 201 may apply the firm on the first to N-th RAID groups, and continue to perform the processing on the tape library device 203 while performing the firm application.

Figure 36:
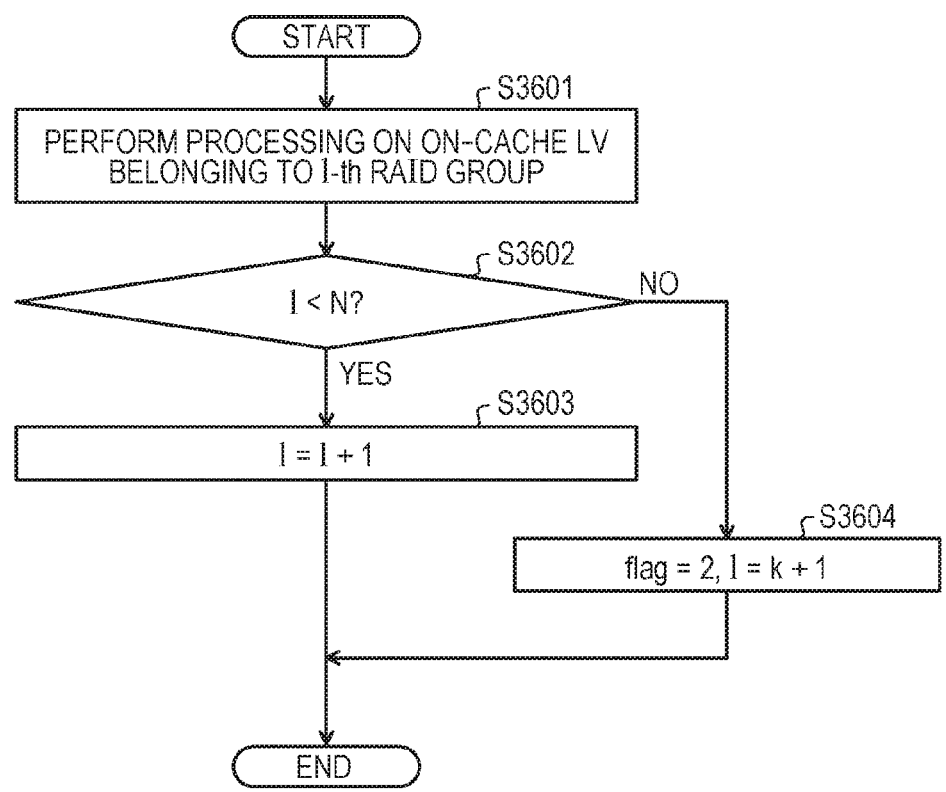
FIG. 36 is a flowchart illustrating an example of processing on an LV with priority "1" in a second half part.

FIG. 36 is a flowchart illustrating an example of the processing on an LV with priority "1" in the second half part. The hierarchical control server 201 performs the processing on the on-cache LV belonging to the l-th RAID group (S3601). Then, the hierarchical control server 201 determines whether l is smaller than N (S3602). When l is smaller than N (S3602: Yes), the hierarchical control server 201 adds 1 to l (S3603). When l is greater than or equal to N (S3602: No), the hierarchical control server 201 sets 2 to the flag, and sets k+1 to l (S3604).

After S3603 or S3604 ends, the hierarchical control server 201 ends the processing on an LV with priority "1" in the second half part. By performing the processing on an LV with priority "1" in the second half part, the hierarchical control server 201 may perform the processing on the on-cache LVs belonging to group A, that is, belonging to the (k+1)-th to N-th RAID groups.

Figure 37:
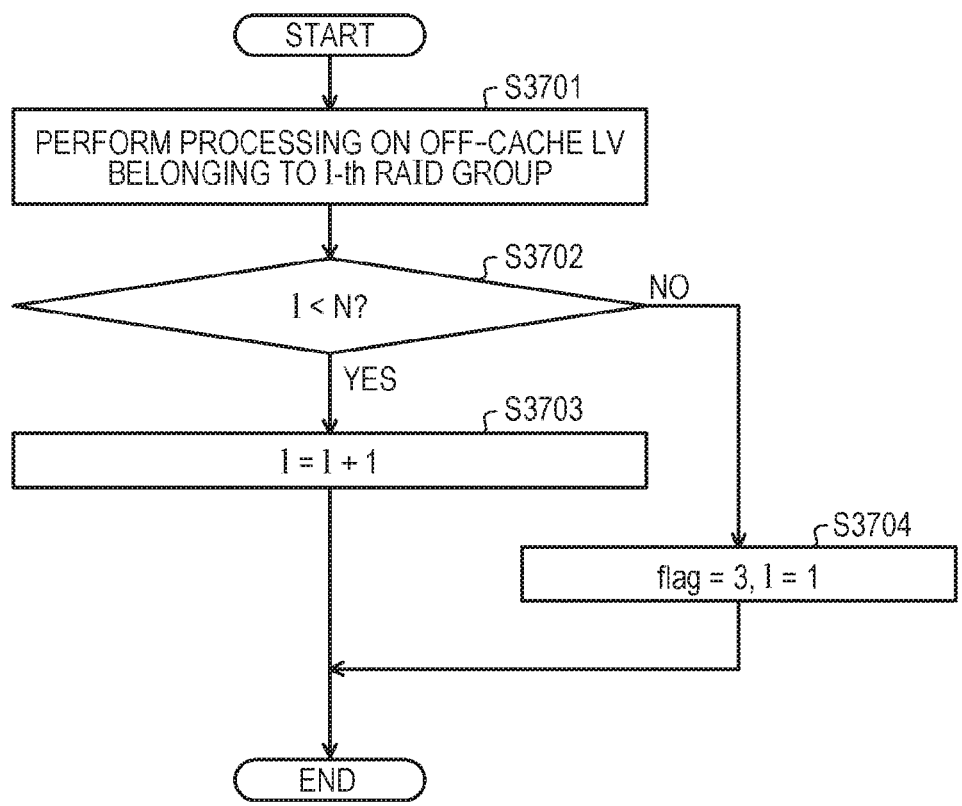
FIG. 37 is a flowchart illustrating an example of processing on an LV with priority "2" in a second half part.

FIG. 37 is a flowchart illustrating an example of the processing on an LV with priority "2" in the second half part. The hierarchical control server 201 performs the processing on the off-cache LV belonging to the l-th RAID group (S3701). Then, the hierarchical control server 201 determines whether l is smaller than N (S3702). When l is smaller than N (S3702: Yes), the hierarchical control server 201 adds 1 to l (S3703). When l is greater than or equal to N (S3702: No), the hierarchical control server 201 sets 3 to the flag, and sets 1 to l (S3704).

After S3703 or S3704 ends, the hierarchical control server 201 ends the processing on an LV with priority "2" in the second half part. By performing the processing on an LV with priority "2" in the second half part, the hierarchical control server 201 may perform the processing on the off-cache LVs belonging to group A, that is, belonging to the (k+1)-th to N-th RAID groups.

Figure 38:
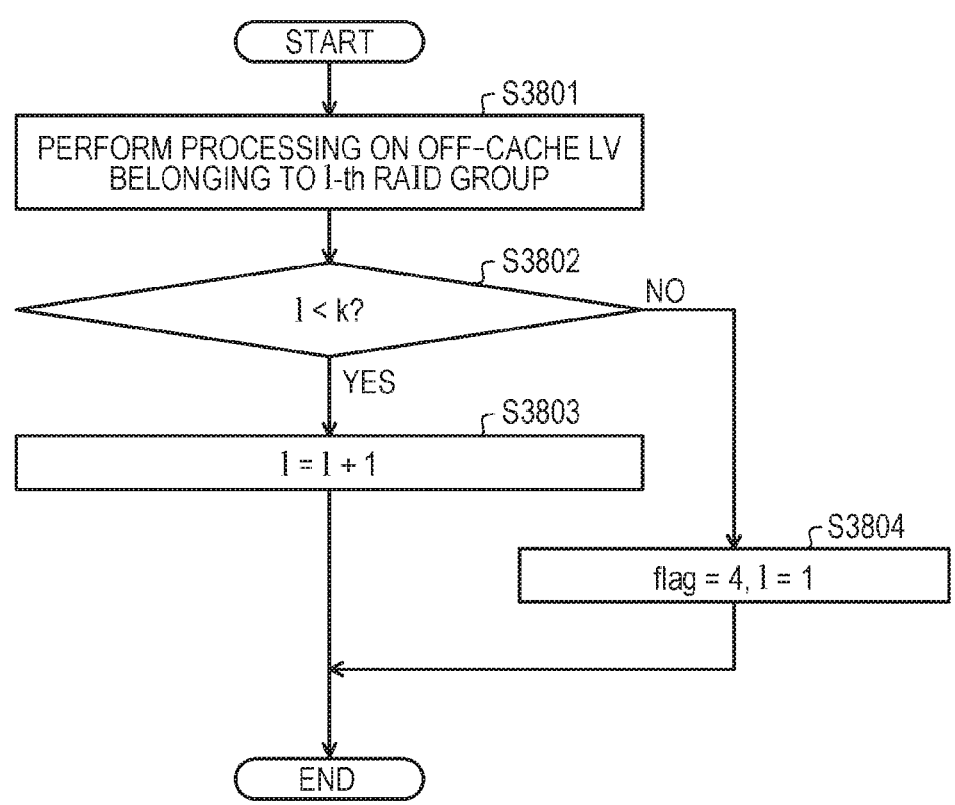
FIG. 38 is a flowchart illustrating an example of processing on an LV with priority "3" in a second half part.

FIG. 38 is a flowchart illustrating an example of the processing on an LV with priority "3" in the second half part. The hierarchical control server 201 performs the processing on the off-cache LV belonging to the l-th RAID group (S3801). In S3801, the hierarchical control server 201 sets, as a recall destination of the recall process, any one of RAID groups that are not under firm application.

Then, the hierarchical control server 201 determines whether l is smaller than k (S3802). When l is smaller than k (S3802: Yes), the hierarchical control server 201 adds 1 to l (S3803). When l is greater than or equal to k (S3802: No), the hierarchical control server 201 sets 4 to the flag, and sets 1 to l (S3804).

After S3803 or S3804 ends, the hierarchical control server 201 ends the processing on an LV with priority "3" in the second half part. By performing the processing on an LV with priority "3" in the second half part, the hierarchical control server 201 may perform the processing on the off-cache LVs belonging to group B, that is, belonging to the first to k-th RAID groups.

Figure 39:
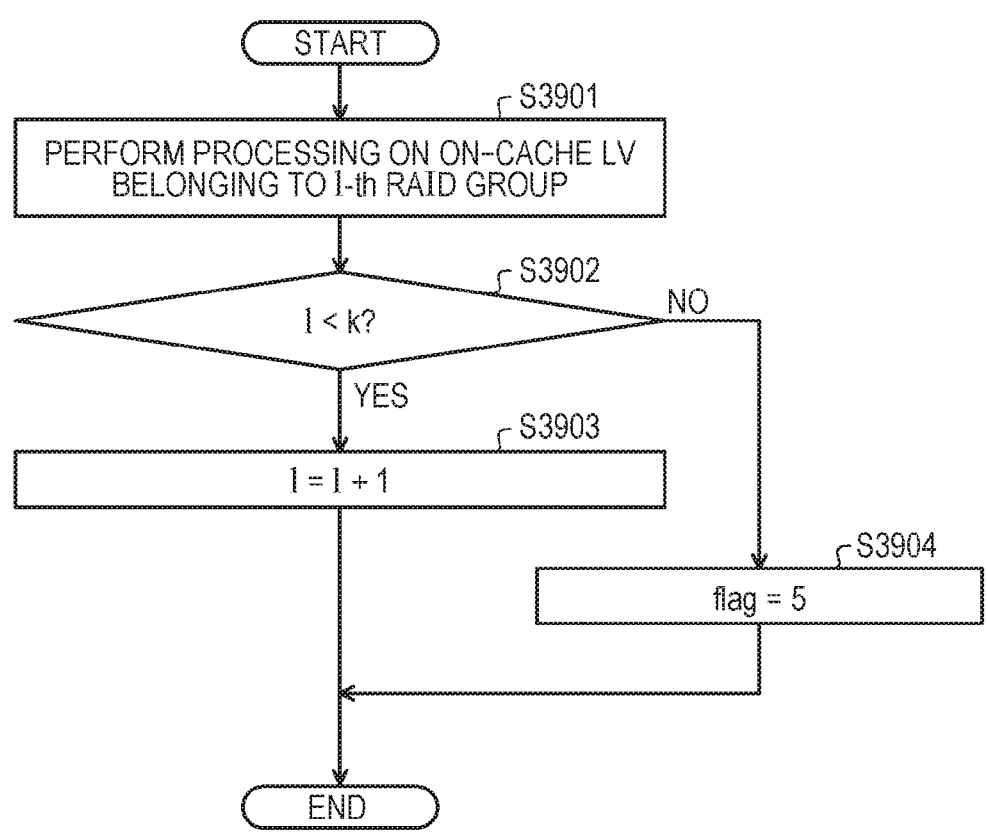
FIG. 39 is a flowchart illustrating an example of processing on an LV with priority "4" in a second half part.

FIG. 39 is a flowchart illustrating an example of the processing on an LV with priority "4" in the second half part. The hierarchical control server 201 performs the processing on the on-cache LV belonging to the l-th RAID group (S3901). In S3901, the hierarchical control server 201 sets, as a recall destination of the recall process, any one of RAID groups that are not under firm application.

Then, the hierarchical control server 201 determines whether l is smaller than k (S3902). When l is smaller than k (S3902: Yes), the hierarchical control server 201 adds 1 to l (S3903). When l is greater than or equal to k (S3902: No), the hierarchical control server 201 sets 5 to the flag (S3904).

After S3903 or S3904 ends, the hierarchical control server 201 ends the processing on an LV with priority "4" in the second half part. By performing the processing on an LV with priority "4" in the second half part, the hierarchical control server 201 may perform the processing on the on-cache LVs belonging to group B, that is, belonging to the first to k-th RAID groups.

Figure 40:
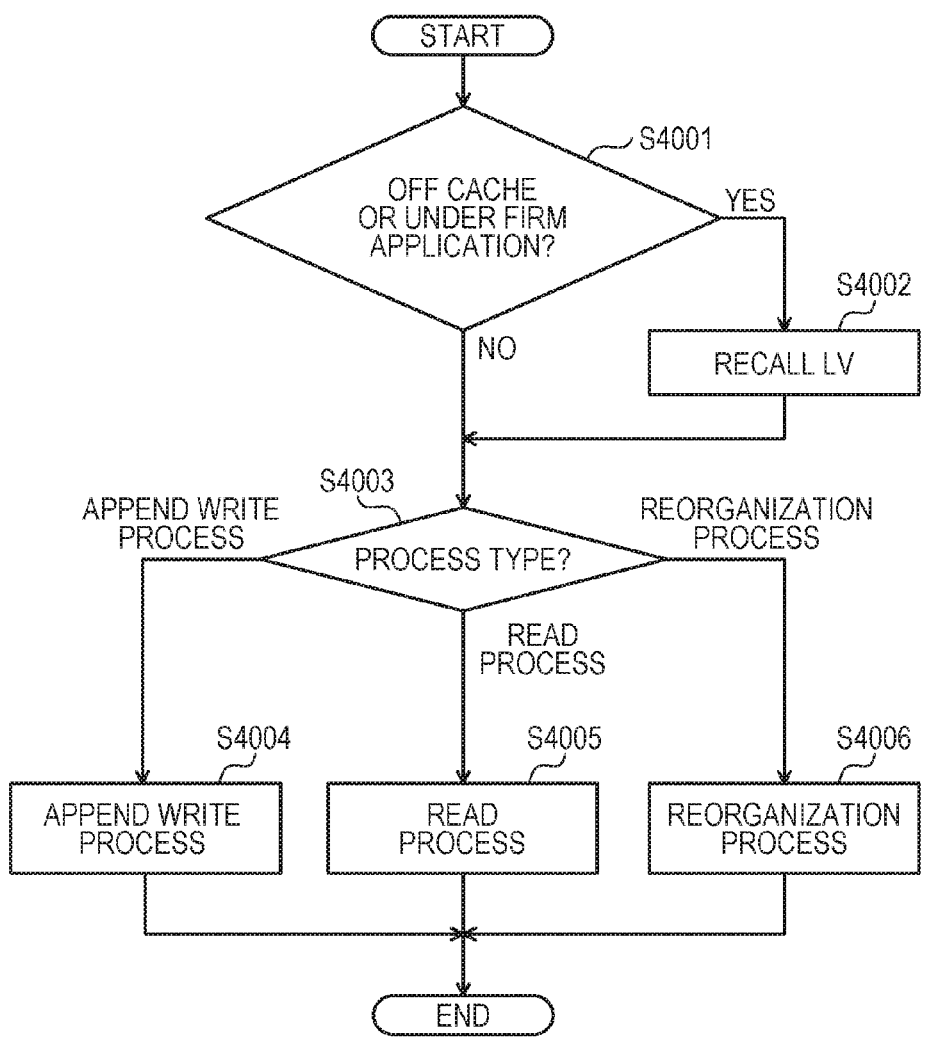
FIG. 40 is a flowchart illustrating an example of processing on an LV under firm application.

FIG. 40 is a flowchart illustrating an example of the processing on an LV under firm application. The processing on an LV under firm application is processing on the LV during the firm application. The hierarchical control server 201 determines whether or not the LV is "off cache" or the RAID group to which the LV belongs is under firm application (S4001). When the LV is "off cache" or the RAID group to which the LV belongs is under firm application (S4001: Yes), the hierarchical control server 201 recalls the LV to a file system of a RAID group which is not under firm application (S4002). When the LV is "off cache", the hierarchical control server 201 may recall the LV for the file system to which the LV belongs.

After S4002 ends or when the LV is "on cache" and the RAID group to which the LV belongs is not under firm application (S4001: No), the hierarchical control server 201 determines the type of the process to be performed on the LV (S4003). The type of the process is one of the append write process, the read process, and the reorganization process.

When the type of the process to be performed on the LV is the append write process (S4003: append write process), the hierarchical control server 201 performs the append write process of writing data to the LV (S4004). When the type of the process to be performed on the LV is the read process (S4003: read process), the hierarchical control server 201 performs the read process of reading data from the LV (S4005). When the type of the process to be performed on the LV is the reorganization process (S4003: reorganization process), the hierarchical control server 201 performs the reorganization process of reorganizing data of the LV (S4006).

After the hierarchical control server 201 ends any one of S4004 to S4006, the hierarchical control server 201 ends the processing on an LV under firm application. By performing the processing on an LV under firm application, the hierarchical control server 201 may perform processing on the LV during the firm application.

As described above, the hierarchical control server 201 classifies a plurality of RAID groups included in the disk array device 202 serving as a cache of the tape library device 203 into group A and group B, and the firm application on one of the groups and the data access to the other group are performed in parallel. Accordingly, with the hierarchical control server 201, since an effect of the cache may be exhibited even for data of the on-cache LV of the RAID group belonging to group A, it is possible to suppress degradation of access performance of the virtual tape library system 200 under firm application. Further, the virtual tape library system 200 may continue to perform the access from the host device 211 during the firm application.

The hierarchical control server 201 may perform, in the first half part, the processing on the on-cache LV of the RAID group belonging to group B prior to the processing on LVs other than the on-cache LV of the RAID group belonging to group B. With this, the hierarchical control server 201 may perform the processing on the on-cache LV of the RAID group belonging to group B, wherever possible, while the file system of group B is mounted. Since the recall process does not occur in the case of the on-cache LV, the hierarchical control server 201 may suppress the degradation of the access performance of the virtual tape library system 200 by causing the recall process not to occur as much as possible.

In order to obtain similar effects in the second half part, the hierarchical control server 201 may perform the processing on the on-cache LV of the RAID group belonging to group A prior to the processing on LVs other than the on-cache LV of the RAID group belonging to group A in the second half part.

The hierarchical control server 201 may perform, in the first half part, the processing on LVs other than the on-cache LV of the RAID group belonging to group A prior to the processing on the on-cache LV of the RAID group belonging to group A. The on-cache LV of the RAID group belonging to group A is unmounted and is inaccessible in the first half part, but may be accessed in the second half part without performing the recall process. Thus, the hierarchical control server 201 may suppress the degradation of the access performance of the virtual tape library system 200 by first performing the processing on LVs other than the on-cache LV of the RAID group belonging to group A such that the recall process does not occur.

In order to obtain similar effects in the second half part, the hierarchical control server 201 may perform the processing on LVs other than the on-cache LV of the RAID group belonging to group B prior to the processing on the on-cache LV of the RAID group belonging to group B in the second half part. This is because the on-cache LV of the RAID group belonging to group B is unmounted and is inaccessible in the second half part, but may be accessed without performing the recall process when the firm application in the second half part is completed.

The hierarchical control server 201 may perform, in the first half part, the processing on the LV of the RAID group belonging to group B prior to the processing on the LV of the RAID group belonging to group A. If the processing on the LV of the RAID group belonging to group A is performed, the hierarchical control server 201 updates RAID#CNF. Accordingly, the hierarchical control server 201 may first perform the processing on the LV of the RAID group belonging to group B and suppress the degradation of access performance of the virtual tape library system 200.

In order to obtain similar effects in the second half part, the hierarchical control server 201 may perform the processing on the LV of the RAID group belonging to group A prior to the processing on the LV of the RAID group belonging to group B in the second half part.

When performing the processing on the LV of the RAID group belonging to group A in the first half part, the hierarchical control server 201 may update the LV information table 401 such that an LV of the RAID group belonging to group B is to be processed. Thus, the hierarchical control server 201 may also exhibit the effect of the cache for the LV that is unmounted and is inaccessible, and suppress the degradation of access performance of the virtual tape library system 200.

In order to obtain similar effects in the second half part, the process performed on group A and the process performed on group B may be replaced with each other. Specifically, the hierarchical control server 201 may update the LV information table 401 such that an LV of the RAID group belonging to group A is to be processed when performing the processing on the LV of the RAID group belonging to group B.

The hierarchical control server 201 may perform the classification into group A and group B on the basis of the time taken for the processing on the LV of the RAID group and the time taken for the firm application of the RAID group. Here, the time taken in the first half part is a time taken for the firm application of the RAID group belonging to group A. Accordingly, by performing the grouping such that the time taken for the processing on the LV of the RAID group belonging to group B is equal to or longer than the time taken in the first half part, the hierarchical control server 201 may maximize the number of the processes for the on-cache LV that has priority "1".

The hierarchical control server 201 may access, after the first half part ends, the tape library device 203 using the RAID group belonging to group A during the firm application on group B in the second half part. Accordingly, the hierarchical control server 201 may also suppress the degradation of access performance of the virtual tape library system 200 during the firm application in the second half part.

In the storage system 100, the first type storage device 102 may be a tape library device, and the second type storage device 103 may be an HDD. Accordingly, the storage system 100 may be applied to a system that provides a virtual service of a tape library, like the virtual tape library system 200.

The method executed by the hierarchical control server 201 according to the present embodiment may be realized by executing a prepared program by a computer such as a personal computer or a work station. This program may be recorded in a computer-readable recording medium such as a hard disk, a flexible disk, a compact disc-read only memory (CD-ROM), or a digital versatile disk (DVD), and may be read from the recording medium by the computer and executed. This program may be distributed over a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A storage control device, comprising:
a memory; and
a processor coupled to the memory and configured to classify second type storage devices into a first group and a second group, the second type storage devices temporarily storing thereof data held in a first type storage device, the second type storage devices being classified into the first group and the second group based on a time taken for processing on data stored in each of the second type storage devices and a time taken for updating firmware of each of the second type storage devices, and access the first type storage device using storage devices belonging to the second group while updating firmware of storage devices belonging to the first group, the updating of the firmware including software for executing an operating system by one or more central processing units of the storage devices belonging to the first group, wherein the processor is configured to classify the second type storage devices into the first group and the second group by adding the time taken for processing for each of the second type storage devices in descending order until a sum of the adding exceeds a predetermined value, classifies the second type storage devices included in the adding into the first group, and classifies the second type storage devices not included in the adding into the second group.

2. The storage control device according to claim 1, wherein
the processor is configured to
perform, while updating the firmware of the storage devices belonging to the first group, processing on data stored in the storage devices belonging to the second group prior to processing on data not stored in the storage devices belonging to the second group.

3. The storage control device according to claim 1, wherein
the processor is configured to
perform, while updating the firmware of the storage devices belonging to the first group, processing on data not stored in the storage devices belonging to the first group prior to processing on data stored in the storage devices belonging to the first group.

4. The storage control device according to claim 1, further comprising:
a storage unit configured to store therein information for identifying each piece of the data held in the first type storage device in association with each of the second type storage devices,
wherein
the processor is configured to
perform, while updating the firmware of the storage devices belonging to the first group, processing on data associated with storage devices belonging to the second group prior to processing on data associated with storage devices belonging to the first group on basis of the information stored in the storage unit.

5. The storage control device according to claim 4, wherein
the processor is configured to
update, while updating the firmware of the storage devices belonging to the first group, the information stored in the storage unit when performing processing on first data associated with a storage device belonging to the first group such that the first data is to be associated with a storage device belonging to the second group.

6. The storage control device according to claim 1, wherein the processor is configured to accesses, after updating the firmware of the storage devices belonging to the first group, the first type storage device using the storage devices belonging to the first group while updating firmware of the storage devices belonging to the second group.

7. The storage control device according to claim 1, wherein the first type storage device stores data in a magnetic tape, and the second type storage devices store data in magnetic disks.

8. A non-transitory computer-readable recording medium having stored therein a program that causes a computer to execute a process, the process comprising:

classifying second type storage devices into a first group and a second group, the second type storage devices temporarily storing thereof data held in a first type storage device, the second type storage devices being classified into the first group and the second group based on a time taken for processing on data stored in each of the second type storage devices and a time taken for updating firmware of each of the second type storage devices, and accessing the first type storage device using storage devices belonging to the second group while updating firmware of storage devices belonging to the first group, the updating of the firmware including software for executing an operating system by one or more central processing units of the storage devices belonging to the first group, wherein the process further comprises classifying the second type storage devices into the first group and the second group by adding the time taken for processing for each of the second type storage devices in descending order until a sum of the adding exceeds a predetermined value, classifying the second type storage devices included in the adding into the first group, and classifying the second type storage devices not included in the adding into the second group.

* * * * *